(12) United States Patent
Uchida

(10) Patent No.: US 7,800,658 B2
(45) Date of Patent: Sep. 21, 2010

(54) CAMERA FOR RECORDING OBSERVATION IMAGE OF MICROSCOPE

(75) Inventor: Tomohiro Uchida, Tokyo (JP)

(73) Assignee: Olympus Corporation, Tokyo (JP)

( * ) Notice: Subject to any disclaimer, the term of this patent is extended or adjusted under 35 U.S.C. 154(b) by 837 days.

(21) Appl. No.: 11/325,637

(22) Filed: Jan. 4, 2006

(65) Prior Publication Data

US 2006/0152582 A1 Jul. 13, 2006

(30) Foreign Application Priority Data

Jan. 13, 2005 (JP) .............................. 2005-005833

(51) Int. Cl.
    *H04N 5/76* (2006.01)
(52) U.S. Cl. ..................... 348/231.2; 348/79
(58) Field of Classification Search ................... 348/79, 348/231.2, 80; 707/205, 609, 809, 821, 822
    See application file for complete search history.

(56) References Cited

U.S. PATENT DOCUMENTS

| | | | | |
|---|---|---|---|---|
| 3,786,184 A * | 1/1974 | Pieters | ......................... | 348/345 |
| 5,708,892 A * | 1/1998 | Kon | ........................... | 396/452 |
| 6,147,797 A * | 11/2000 | Lee | ............................. | 359/363 |
| 6,441,958 B1 * | 8/2002 | Yeung et al. | .................. | 359/372 |
| 6,477,265 B1 * | 11/2002 | Sheng | ........................ | 382/145 |
| 6,594,075 B1 * | 7/2003 | Kanao et al. | ................ | 359/385 |
| 6,734,895 B1 * | 5/2004 | Uehara et al. | .................. | 348/79 |
| 6,952,230 B2 * | 10/2005 | Ejima et al. | ............ | 348/333.05 |
| 7,084,916 B2 * | 8/2006 | Morimoto et al. | ...... | 348/333.01 |
| 7,149,332 B2 * | 12/2006 | Bacus et al. | ................ | 382/128 |
| 7,149,505 B2 * | 12/2006 | Paik et al. | ..................... | 455/415 |
| 7,248,282 B2 * | 7/2007 | Maddison | .................... | 348/79 |
| 7,289,199 B2 * | 10/2007 | Yonetani et al. | ............. | 356/124 |
| 7,315,414 B2 * | 1/2008 | Swift et al. | .................. | 359/392 |
| 7,358,991 B2 * | 4/2008 | Kokubun | .................. | 348/231.2 |
| 7,400,342 B2 * | 7/2008 | Gaida et al. | .................... | 348/77 |
| 7,426,345 B2 * | 9/2008 | Takamatsu et al. | .......... | 396/432 |
| 2002/0018126 A1 * | 2/2002 | Ikeda et al. | .................. | 348/222 |
| 2002/0059301 A1 * | 5/2002 | Hayashi et al. | .......... | 707/104.1 |
| 2003/0016301 A1 * | 1/2003 | Aizaki et al. | ................ | 348/345 |
| 2003/0095196 A1 * | 5/2003 | Misawa | ................. | 348/231.99 |
| 2004/0032513 A1 * | 2/2004 | Kokubun | .................. | 348/231.7 |
| 2004/0105018 A1 * | 6/2004 | Takahashi et al. | ........ | 348/231.2 |
| 2004/0196365 A1 * | 10/2004 | Green et al. | ................... | 348/79 |
| 2004/0252198 A1 * | 12/2004 | Hatanaka | ................. | 348/207.1 |
| 2005/0052548 A1 * | 3/2005 | Delaney | .................. | 348/231.2 |

(Continued)

FOREIGN PATENT DOCUMENTS

JP         10-124353 A         5/1998

(Continued)

*Primary Examiner*—Tuan Ho
*Assistant Examiner*—Kent Wang
(74) *Attorney, Agent, or Firm*—Frishauf, Holtz, Goodman & Chick, P.C.

(57) ABSTRACT

A camera for recording a specimen image obtained by a microscope includes a record control unit for making a storage medium record an image data file expressing the specimen image, and a switch unit for controlling a supply of power to the camera. The camera also includes an attribute setting unit for setting a read only attribute for a data file that is already recorded by the storage medium at a time when the switch unit starts the supply of power.

15 Claims, 33 Drawing Sheets

U.S. PATENT DOCUMENTS

2006/0152599 A1 * 7/2006 Yokonuma et al. ..... 348/231.99

FOREIGN PATENT DOCUMENTS

| JP | 3446524 B2 | 9/1998 |
| JP | 2002-024067 A | 1/2002 |
| JP | 2002-176578 A | 6/2002 |
| JP | 2002-369120 A | 12/2002 |
| JP | 2003-196077 A | 7/2003 |

* cited by examiner

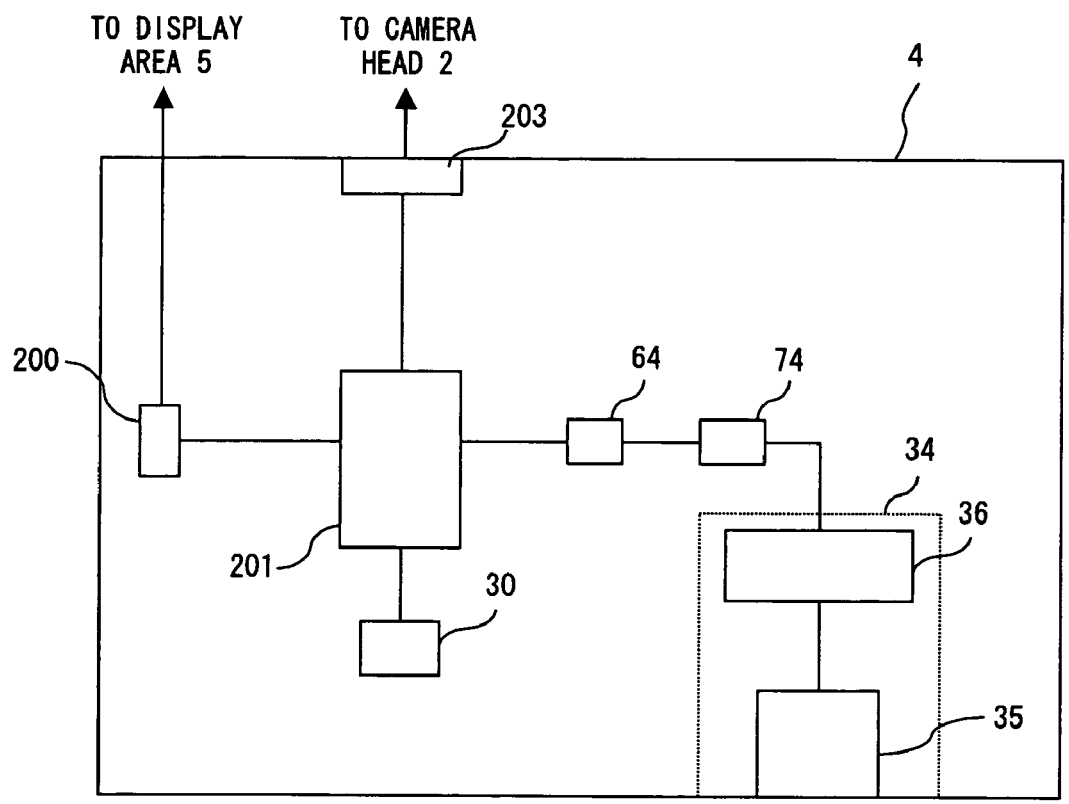
F I G. 3 B

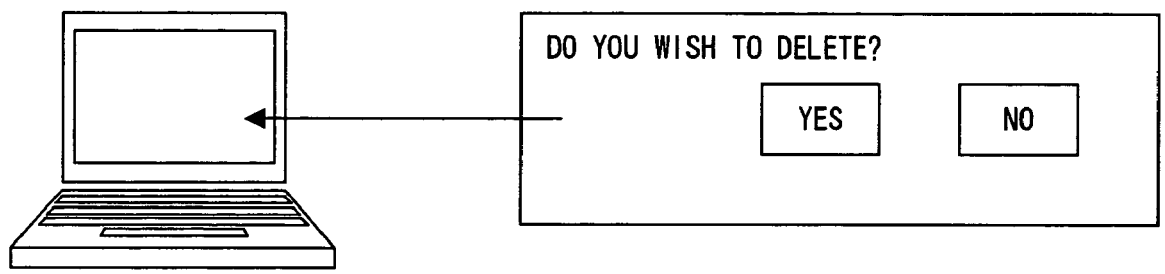
F I G. 7

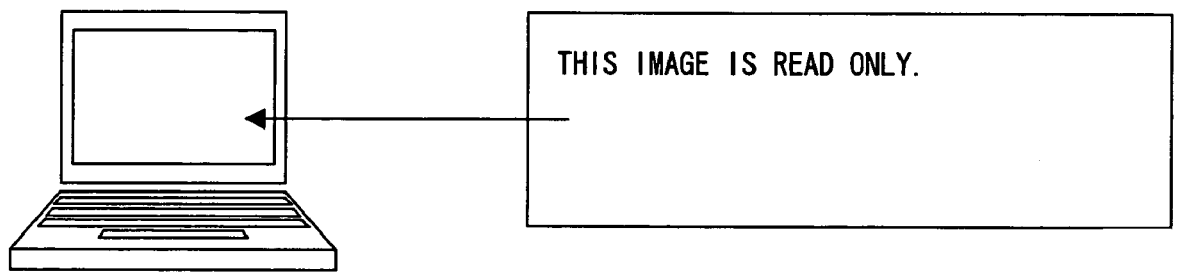
F I G. 8

| ID | FILE NAME | ATTRIBUTE |
|----|-----------|-----------|
| 1 | Pic001.jpg | 1 |
| 2 | Pic002.jpg | 1 |
| 3 | Pic003.jpg | 1 |
| 4 | Pic004.jpg | 1 |

FIG. 11

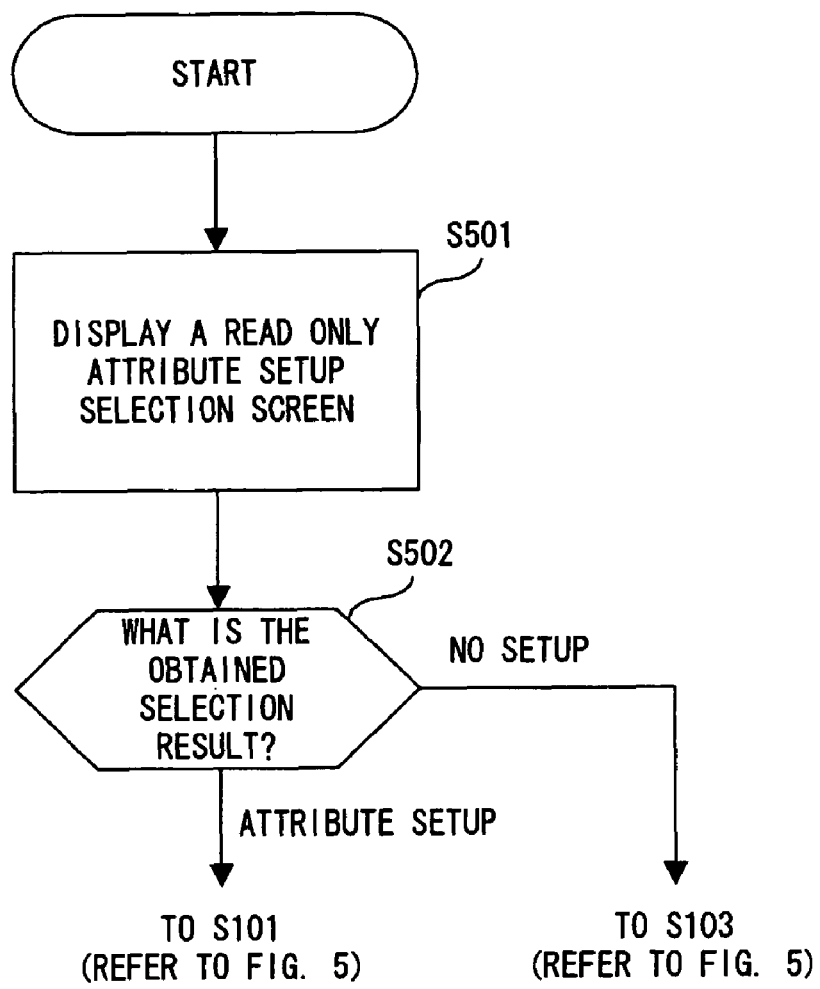
F I G. 1 4

FORMATTING HAS BEEN CANCELLED BECAUSE
THERE IS A READ ONLY FILE.

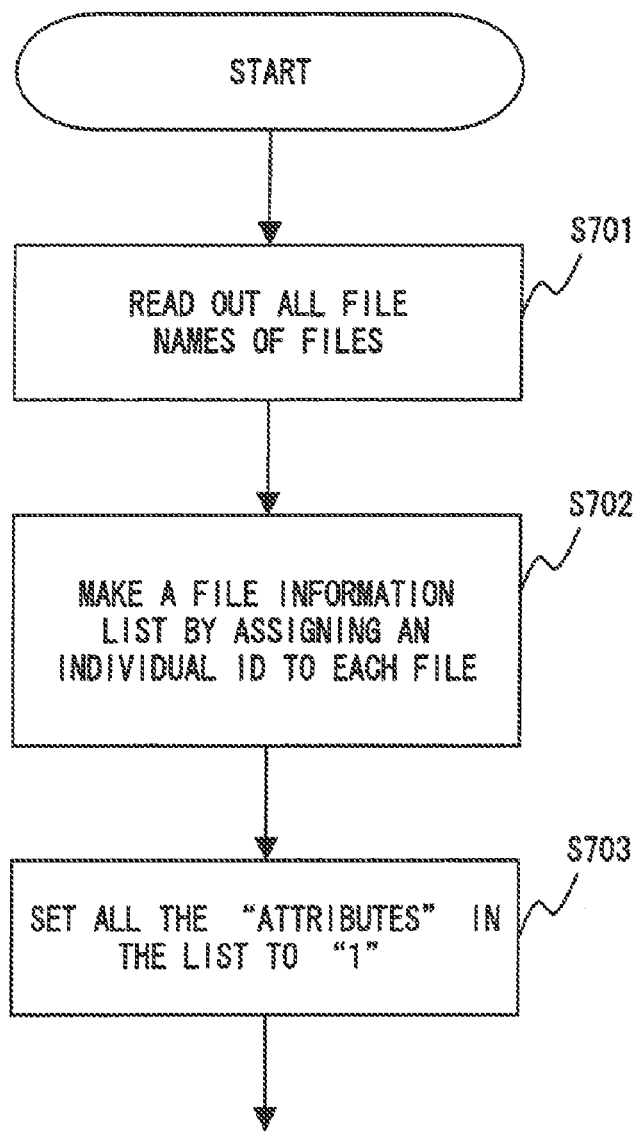
F I G. 1 8 A

| ID VALUE |
|---|
| 1234 |

FIG. 22

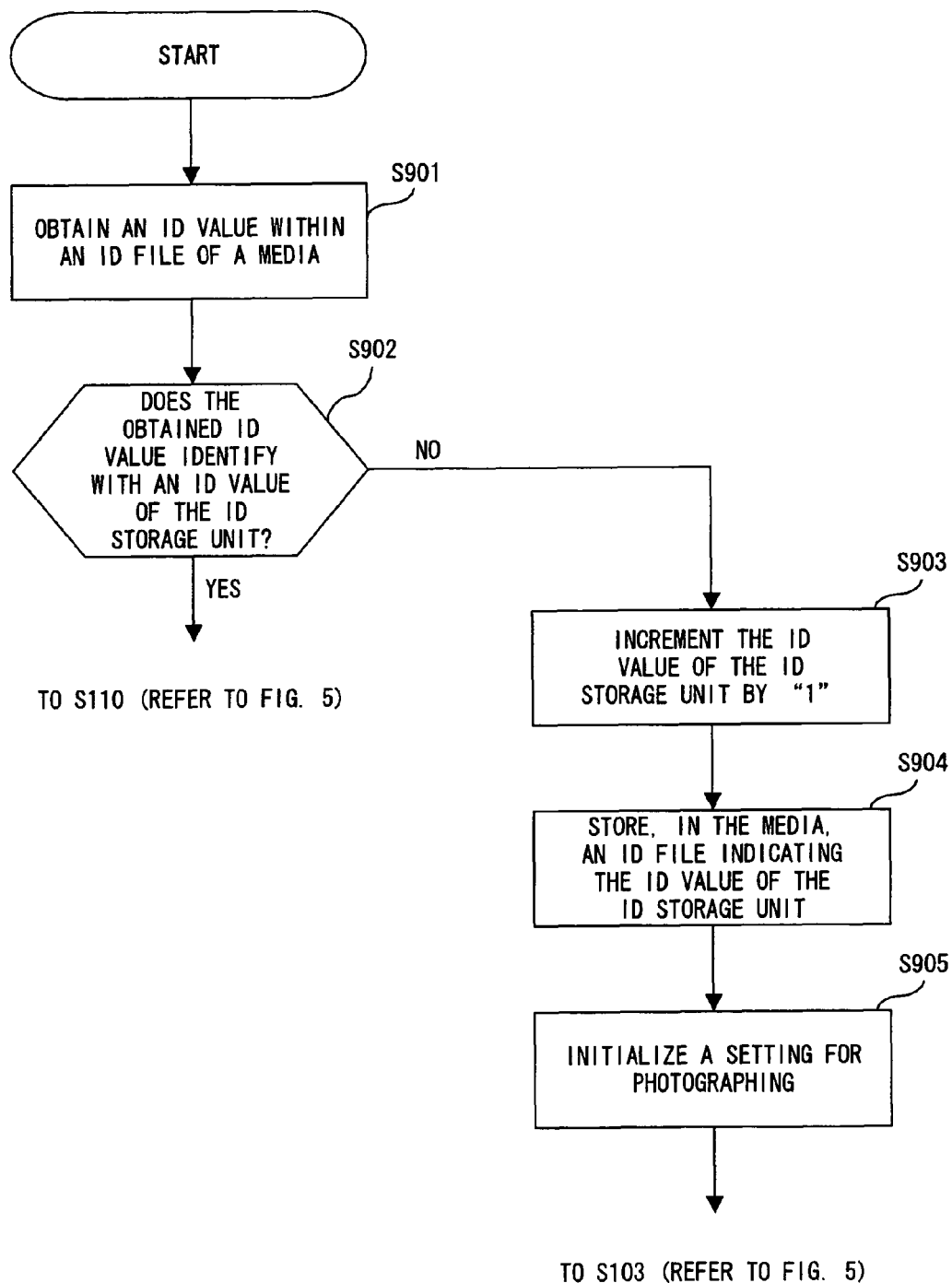
F I G. 2 3

CAMERA FOR RECORDING OBSERVATION IMAGE OF MICROSCOPE

CROSS REFERENCE TO RELATED APPLICATIONS

This application claims benefit of Japanese Application No. 2005-5833, filed Jan. 13, 2005, the contents of which are incorporated by this reference.

BACKGROUND OF THE INVENTION

1. Field of the Invention

The present invention relates to a data management technique, and particularly to a technique for managing an image data file expressing an observation image in a camera that records the aforementioned observation image of a microscope.

2. Description of the Related Art

A microscope-use digital camera for photographing an observation image of a microscope, generating and recording image data expressing the aforementioned observation image is equipped with a storage medium that is capable of being read from and written to by a computer (simply "PC" hereinafter) such as a flexible disk or a semiconductor memory card. Such image data expressing an observation data recorded by the storage medium is generally stored as an image data file (simply "image file" hereinafter) conforming to a general purpose image-use data format allowing a displaying on a PC, such as the JPEG (Joint Photographic Experts Group) system.

In the meantime, the number of images (i.e., the number of image files) that one recording medium records has been on the increase keeping pace with recent capacity increases of storage media, possibly reaching anywhere from thousands to as many as tens of thousands. This makes it imperative to enable a microscope-use digital camera to put image files recorded by a storage medium in order. With regards to such a function, generally propagating is for example a microscope-use digital camera with a group delete function enabling a deletion of all image files in a storage medium simply in one operation or a function enabling an observing person to delete an unnecessary image file by specifying it. Also widely popular is a PC-controlled microscope-use digital camera which is furnished with the function of the camera connecting to a PC so as to enable a camera control, image recording, replay handling, et cetera, and of recording and storing an image file for an already photographed image by using a PC which comprises a typical large capacity hard disk apparatus, larger than a storage medium detachably attachable to the camera. Such a camera is capable of diverse kinds of file handling by the functions typically equipped in a PC, such as an image file sorting function, an image file group delete function by an observing person specifying a plurality of images, or a file name change function in addition to the above described file group delete function and specified image delete function.

Conventionally various techniques have been proposed with regard to such data file arrangement functions.

For example, a laid-open Japanese patent application publication No. 10-124353 has disclosed a technique for recording image files with the recording date & time in a recording medium, deleting an image with an old recording date & time automatically and at the same time deleting an image with the oldest recording date & time when the remaining recording capacity of the recording medium becomes smaller than a setup value, thereby relieving the user of a file arrangement handling and enabling a recording medium with a small recording capacity to photograph more images. This technique, however, can erroneously erase an image, with an old recording date & time, which it is desired to store, and cannot group images stored by a storage medium into unnecessary and necessary images groups, respectively.

For another example, a laid-open Japanese patent application publication No. 2002-24067 has disclosed a technique for holding a setup file including user information and allowing an access only to a file identifying with the selected user information, thereby improving a usage convenience by enabling a setup for each user preference even if an apparatus is being shared. This technique, however, requires a specific setup file, hence making the configuration of the apparatus complex.

For yet another example, a laid-open Japanese patent application publication No. 2002-176578 has disclosed a technique for separating a music file and an image file from each other and making it possible to delete them either one by one or as a group, thereby improving a file arrangement performance. This document, however, does not disclose anything about an observing person setting up a category of files to be separated.

For still another example, a laid-open Japanese patent application publication No. 2002-369120 has disclosed a technique for making it possible to delete transmitted or received images grouped in an electronic image apparatus such as an electronic camera with a telecommunication function for exchanging images with the outside. But the technique premises a transmission of and a reception of an image file.

For yet still another example, a Japanese patent publication No. 3446524 has disclosed a technique for recording an identifier code along with recording an image by a camera, making it possible to identify whether the file stored by a recording medium is an image file of the camera itself or is made by another apparatus such as another camera when the camera handles the image file, and prohibiting erasing a file made by the other apparatus when the observing person operates the camera to delete an image, thereby enabling the protection of an image made by another apparatus. This technique, however, leaves a possibility of deleting an image recorded by another person who photographed and stored it by using the camera itself in the case of a plurality of observing persons sharing one camera.

For yet further example, a laid-open Japanese patent application publication No. 2003-196077 has disclosed a technique for removing an image designated for printing from the subject of erasure, thereby preventing an image to be printed later from being erased. The technique, however, provides no particular consideration to an image to be stored but not to be printed.

SUMMARY OF THE INVENTION

A camera as one aspect of the present invention, for recording a specimen image obtained by a microscope, is configured to include a record control unit for making a storage medium record an image data file expressing the specimen image; a switch unit for controlling a supply of power to the camera; and an attribute setting unit for setting up a read only attribute for a data file already recorded by the storage medium at a time when the switch unit starts a supply of the power.

The above described camera according to the present invention may also be configured to further include a display unit for replaying and displaying an image expressed by an image data file, wherein the attribute setting unit sets the attribute for an image data file expressing an image displayable by the display unit among the data file.

And the aforementioned camera according to the present invention may also be configured to further include a list creation unit for creating a list of data file(s) recorded by the storage medium.

And in this case the configuration may be such that the list creation unit creates a list of data file(s) already recorded by the storage medium at a time of starting a supply of the power when the switch unit starts the supply of the power.

And in this case the configuration may also be such that the attribute setting unit cancels the attribute set for a data file(s) shown in the list when a supply of the power is stopped by the switch unit.

And in this case the configuration may be such that the list creation unit adds a read only attribute to a data file already recorded by the storage medium to the list at the time of a supply of the power being started by the switch unit, while the list creation unit does not add a read only attribute to an image data file which the record control unit has made the recording medium record, after a supply of the power is started.

A camera as one of another aspect of the present invention, for recording a specimen image obtained by a microscope, is configured to include a record control unit for making the camera record, in a detachably attachable storage medium, an image data file expressing the specimen image; and an attribute setting unit for setting a read only attribute of a data file already recorded by the storage medium at the time of insertion when the storage medium is inserted.

The above described camera according to the present invention may also be configured to further include a selection unit for selecting as to whether or not to make the attribute setting unit set the attribute.

The above described camera according to the present invention may also be configured to further include an initialization unit for applying an initialization processing to the storage medium; and an initialization control unit for controlling the initialization unit so as not to apply the initialization processing to the storage medium, if a read only attribute is set for a data file recorded by the storage medium.

A camera as one of yet another aspect of the present invention, for recording a specimen image obtained by a microscope, is configured to include a record control unit for making a storage medium record an image data file expressing the specimen image; a switch unit for controlling a supply of power to the camera; a list creation unit for creating a list of data file(s) already recorded by the storage medium at a time when the switch unit starts a supply of the power; a delete unit for deleting a record of data file(s) in the storage medium; and a delete control unit for making the aforementioned delete unit delete only a record of data file(s) not included in the list among a record of data file(s) stored by the storage medium when obtaining an instruction to delete the record of data file(s).

The above described camera according to the present invention may be configured to further include a display unit for replaying and displaying an image expressed by an image data file, wherein the list creation unit creates the list for only image data file(s) expressing image(s) displayable by the display unit among the data files.

A camera as one of yet another aspect of the present invention, for recording a specimen image obtained by a microscope, is configured to include a record control unit for making the camera record, in a detachably attachable storage medium, an image data file expressing the specimen image; a judgment unit for judging whether or not the storage medium that is inserted is the same as the one inserted immediately prior to the time when the storage medium is inserted; and an attribute setting unit for setting a read only attribute of a data file already recorded by the storage medium when the judgment unit judges that the inserted storage medium is the one inserted immediately prior thereto.

The above described camera according to the present invention may also be configured to further include an imaging unit for generating the image data file by photographing the specimen image; and an action condition initialization unit for initializing a setup of an action condition of the imaging unit when the judgment unit judges that the inserted storage medium is not the one inserted immediately prior thereto.

And the above described camera according to the present invention may also be configured to further include an identifier information record unit for generating identifier information for identifying the storage medium individually and making the storage medium record it, wherein the judgment unit carries out the judgment by using the identifier information recorded by the storage medium.

And in this case, the configuration may be such that the judgment unit compares the identifier information recorded by the inserted storage medium with the identifier information recorded by another storage medium inserted immediately prior thereto and, if both pieces of identifier information identify with each other, judges that the inserted storage medium is the same as the storage medium inserted immediately prior thereto.

And in this case, the configuration may also be such that the identifier information record unit makes the inserted storage medium store the identifier information anew if said judgment unit judges that the inserted storage medium is not the storage medium inserted immediately prior thereto.

Also the above described camera according to the present invention may also be configured to include a control unit for controlling an action of the aforementioned camera based on a control signal sent from another apparatus.

BRIEF DESCRIPTION OF THE DRAWINGS

The present invention will be more apparent from the following detailed description when the accompanying drawings are referenced.

FIG. 3B shows an electrical configuration of an operator area;

FIG. 7 shows an example of a delete execution instruction confirmation screen;

FIG. 8 shows an example of a delete execution inhibit notification screen;

FIG. 11 shows an example of a file information list;

FIG. 14 shows a changed part in a modification of a fifth embodiment of a control processing shown by FIG.

FIG. 18A shows a changed part in the seventh embodiment of a control processing shown by FIG. 5;

FIG. 22 shows an example of data in an ID file;

FIG. 23 shows a changed part in the ninth embodiment of a control processing shown by FIG. 5.

DESCRIPTION OF THE PREFERRED EMBODIMENTS

The following is a detailed description of the preferred embodiments of the present invention while referring to the accompanying drawings.

First Embodiment

Figure 1:
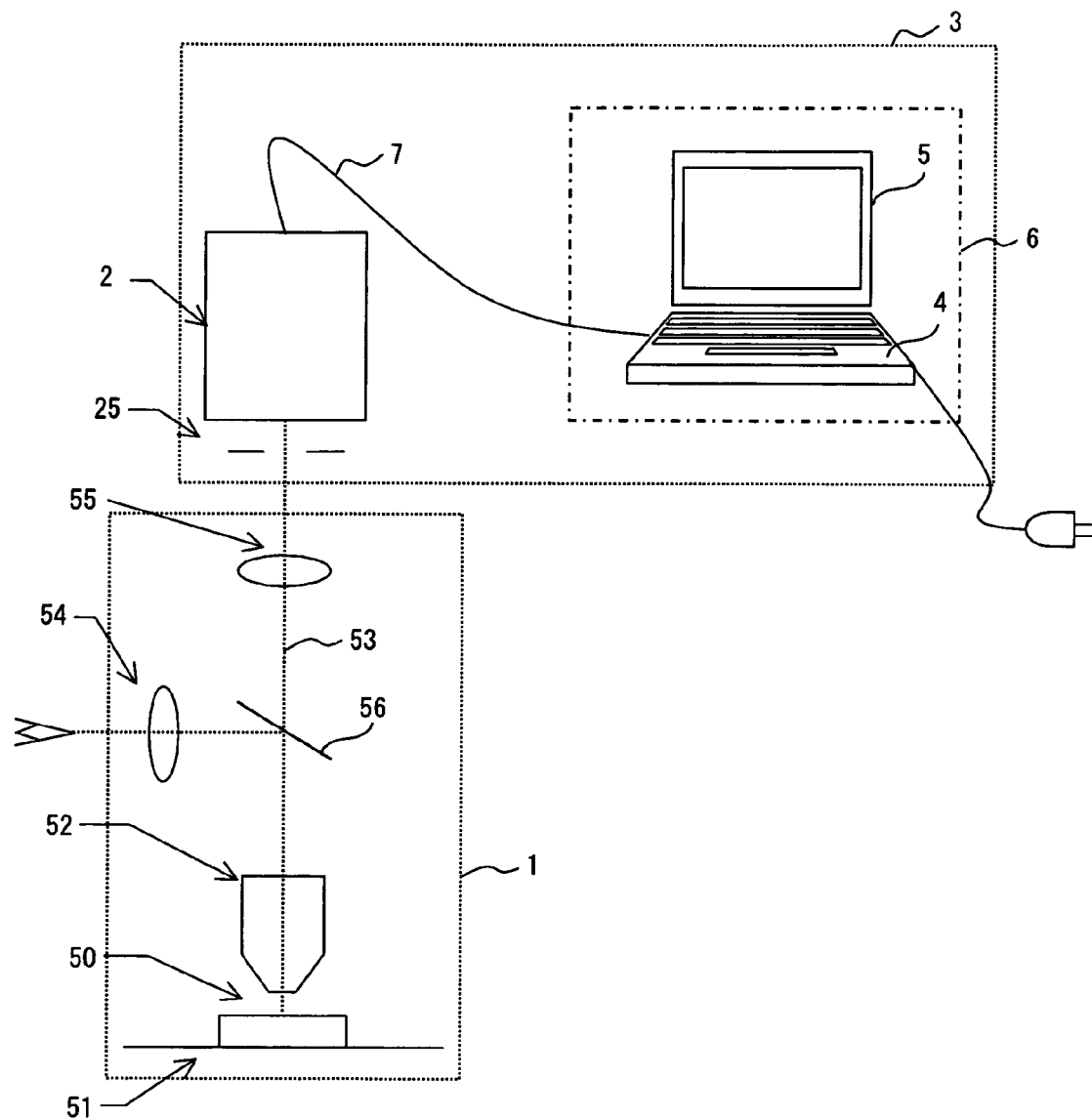
FIG. 1 shows a configuration of an observation system including a microscope-use digital camera as an embodiment of the present invention.

FIG. 1 shows a configuration of an observation system including a microscope-use digital camera as an embodiment of the present invention.

Referring to FIG. 1, a microscope-use digital camera 3 comprises a camera head unit 2 and an operator & display unit 6 which is comprised as a separate chassis, of which comprisal the camera head unit 2 is placed on the optical axis 53 of the light expressing an image of a specimen 50 (i.e., a specimen image) incident from a microscope main body 1.

The microscope main body 1 fundamentally comprises a stage 51 for placing the specimen 50, an objective lens 52 for observing the specimen 50, an eyepiece 54 for an observer to look through by focusing the light from the microscope main body 1 as a specimen image, an imaging lens 55 for imaging the aforementioned light in the optical receiving part of the camera head unit 2 as the specimen image, a half mirror 56 for directing a part of the light incident on the optical axis 53 to the eyepiece 54, et cetera.

Figure 2:
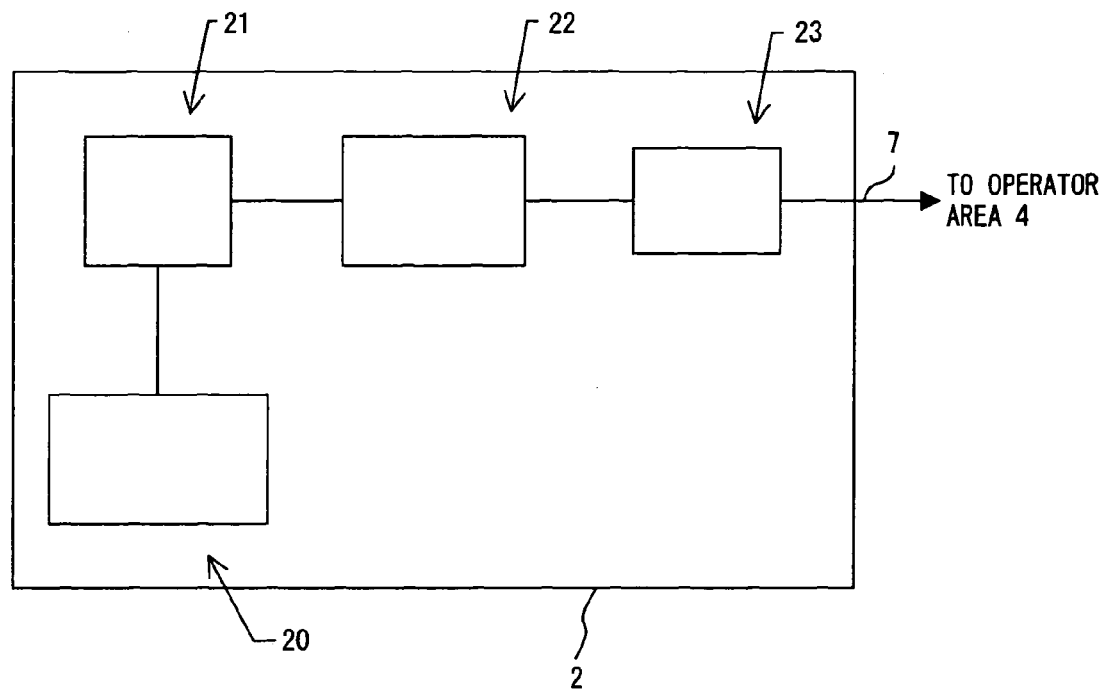
FIG. 2 shows an internal configuration of a camera head unit.

FIG. 2 shows an internal configuration of a camera head unit 2.

As shown by FIG. 2, the camera head unit 2 comprises a photoelectric conversion element 20 for photo-electrically converting a specimen image focused on the optical receiving surface, a sampling circuit 21 for sampling an electrical signal output from the photoelectric conversion element 20 in a certain time interval, an A/D (analog/digital) converter 22 for converting a sampling signal, that is, an analog signal, to digital data, and an image processing unit 23 for generating an image of the specimen 50 based on the converted digital data. Here, the photoelectric conversion element 20 utilizes a CCD (charge coupled device) for example. Incidentally, a shutter 25 is equipped between the microscope main body 1 and camera head unit 2 for blocking the light reaching the optical receiving surface of the photoelectric conversion element 20 at a desired time as shown by FIG. 1. The shutter 25 may be a mechanical shutter for blocking the light mechanically, while an electronic shutter for blocking the light according to an electrical signal may be used instead.

Returning to the description of FIG. 1, the camera head unit 2 and the operator & display unit 6 are connected by a cable 7, enabling a mutual exchange of electrical signals and an installation of the operator & display unit 6 remotely from the camera head unit 2 within the allowable range of the length of the cable 7.

The operator & display unit 6 comprises integrally an operator area 4 for the observing person to carry out various operations in order to instruct an operation control of the camera head unit 2 and a display area 5 for displaying a specimen image of the specimen 50 which is directed to the camera head unit 2. Note that the display area 5 is configured to have the function of displaying various setup status of photographing conditions carried out by operations in the operator area 4, et cetera.

The operator area 4 and display area 5 are fixed by keeping a predetermined angle with each other. For example, if the operator & display unit 6 is placed on a desktop, the operator area 4 is approximately parallel with the desktop surface, while the display area 5 is at an angle which is easily operable for the observing person anywhere between 0° and 90° with the desktop, e.g., approximately at 90°. Note that the state of the display area 5 being at an angle of 0° with the desktop means that both the operator area 4 and display area 5 are in the state of being horizontal, that is, the state in which the various switches equipped in the operator area 4 and the display panel furnished in the display area 5 are placed on the same plane.

Figure 3A:
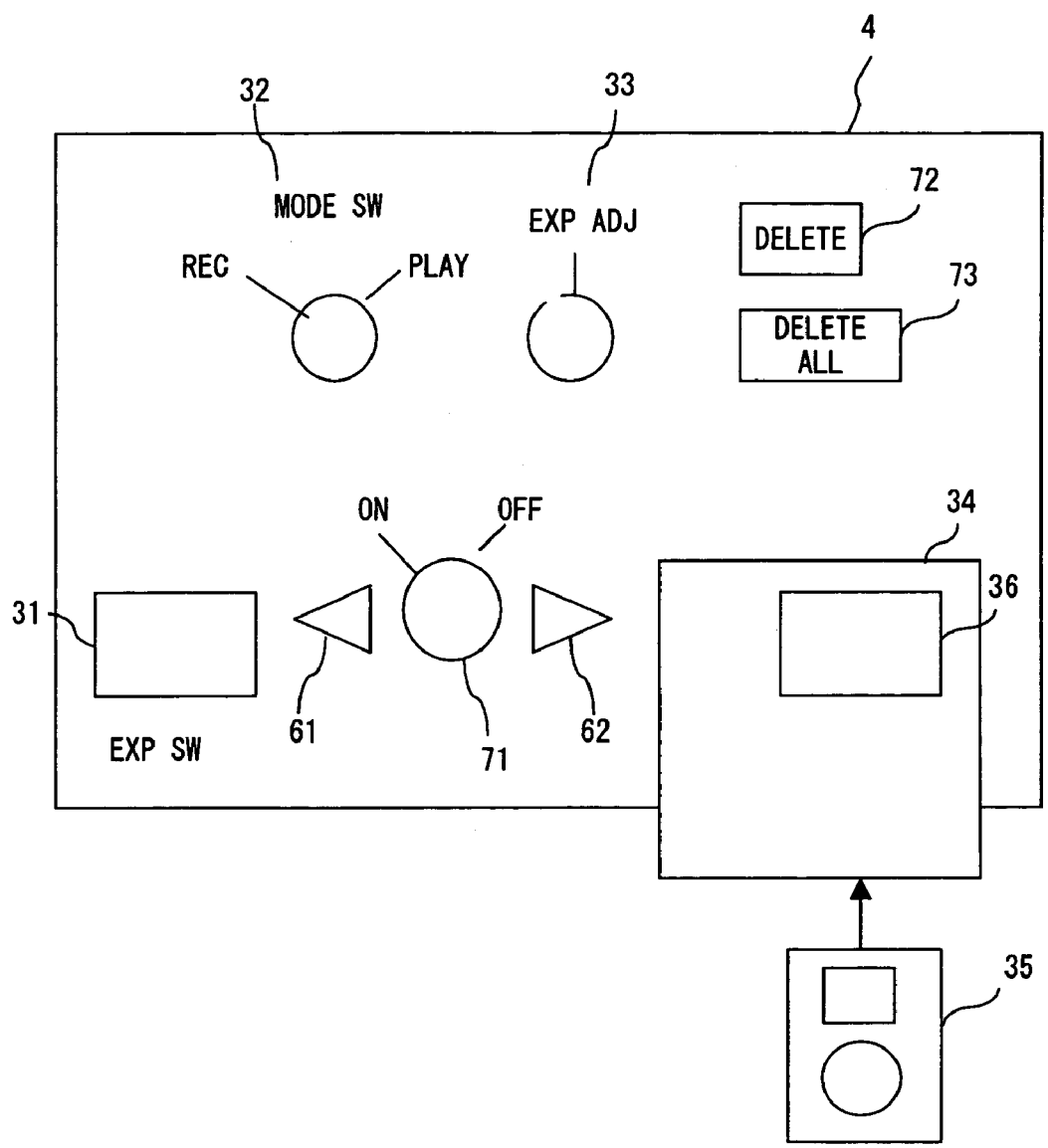
FIG. 3A shows an external configuration of an operator area.

FIG. 3A shows an external configuration of the operator area 4.

The operator area 4 is equipped with a power supply switch 71 for instructing the supply of power to respective parts of the microscope-use digital camera 3; a mode switch 32 for selecting at least one of the two modes, i.e., "photographing operation mode" for carrying out a photographing operation, or "replay mode" for replaying the recorded photography image, by the observing person switching the operation mode of the microscope-use digital camera 3; an exposure adjustment switch 33 for setting a correction value for an exposure correction to be made at the time of photographing a specimen image; a delete-one switch 72 and a delete-all switch 73 both for erasing the recorded observation image during the replay mode; operation control switches such as a shutter switch 31, left selection switch 61 and right selection switch 62; and, further, a memory apparatus 34 for storing photography images.

The memory apparatus 34 includes a memory readout & write unit 36 capable of writing a photographed image in, and reading it out of, a detachably attachable removable media 35 such as a flexible disk widely used for a PC, et cetera.

FIG. 3B shows an electrical configuration of the operator area 4.

In FIG. 3B, an operator part 30 comprises a series of switches as shown by FIG. 3A. Various operations performed on the operator part 30 by the observing person are analyzed by a control process unit (simply "CPU" hereinafter) 201, which includes a central processing apparatus, a ROM for storing a program for making the aforementioned central processing apparatus execute a later described series of control processing, a RAM for use as a working storage domain for the aforementioned central processing apparatus executing the aforementioned program, et cetera, and in which a processing related to the aforementioned operation is carried out.

For instance, when having the display area 5 display an image, et cetera, the CPU 201 executes a processing of writing data in the display-use RAM 200 so that the display area 5 displays based on the aforementioned data. Meanwhile, for photographing related controls, the CPU 201 generates a prescribed control signal for providing the camera head unit 2 an instruction related to photographing which corresponds to an operation on the operators part 30 and carries out the processing of transmitting the aforementioned control signal from a camera head connector 203 to the camera head unit 2 by way of the cable 7, thus the aforementioned instruction controls an operation of the camera head unit 2 (including the shutter 25). And when recording digital image data transmitted from the image processing unit 23 comprised by the camera head unit 2 by way of the cable 7 in a removable media 35, i.e., a storage medium, the CPU 201 is disposed to carry out the processing of transmitting the aforementioned image data to a memory readout & write unit 36 by a prescribed file format. Note that the present embodiment is configured to use the FAT (File Allocation Table) file system of the well known MS-DOS (registered trademark), thereby carrying out the management of a data file within a removable media 35.

Between the memory apparatus 34 and CPU 201 is equipped a record count detection unit 64 for detecting the number of image files recorded by the removable media 35 and a readout attribute setting unit 74 for setting up a read only attribute (i.e., attributes for inhibiting operations such as addition, change or erase of data contained by the aforementioned file) for a file recorded by the removable media 35.

Figure 4:
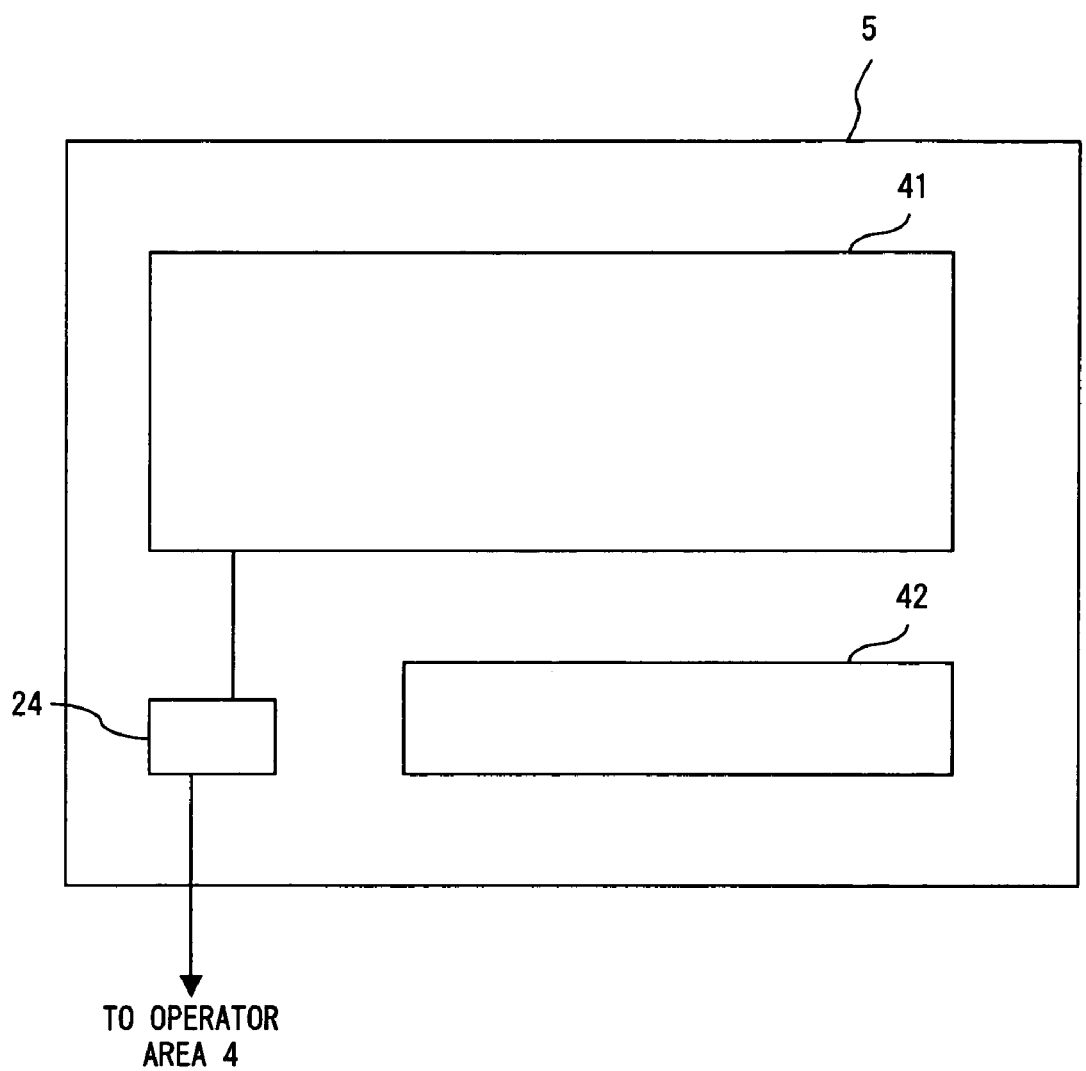
FIG. 4 shows a configuration of a display area.

The next description is of FIG. 4 which shows a configuration of the display area 5.

The display area 5 is equipped with an image display panel 41 for displaying a replay image of a photographed image or a stored image by the memory apparatus 34 and an information display panel 42 for displaying photography information such as an exposure time and exposure correction for photographing, and replay information such as an image file name for replaying. Furthermore, it is equipped by a D/A (digital to analog) converter 24 which becomes necessary for displaying an image expressed by data stored in a display-use RAM 200 of the operator area 4. The D/A converter 24 converts image data, that is, a digital signal, into an analog electric signal.

Figure 5:
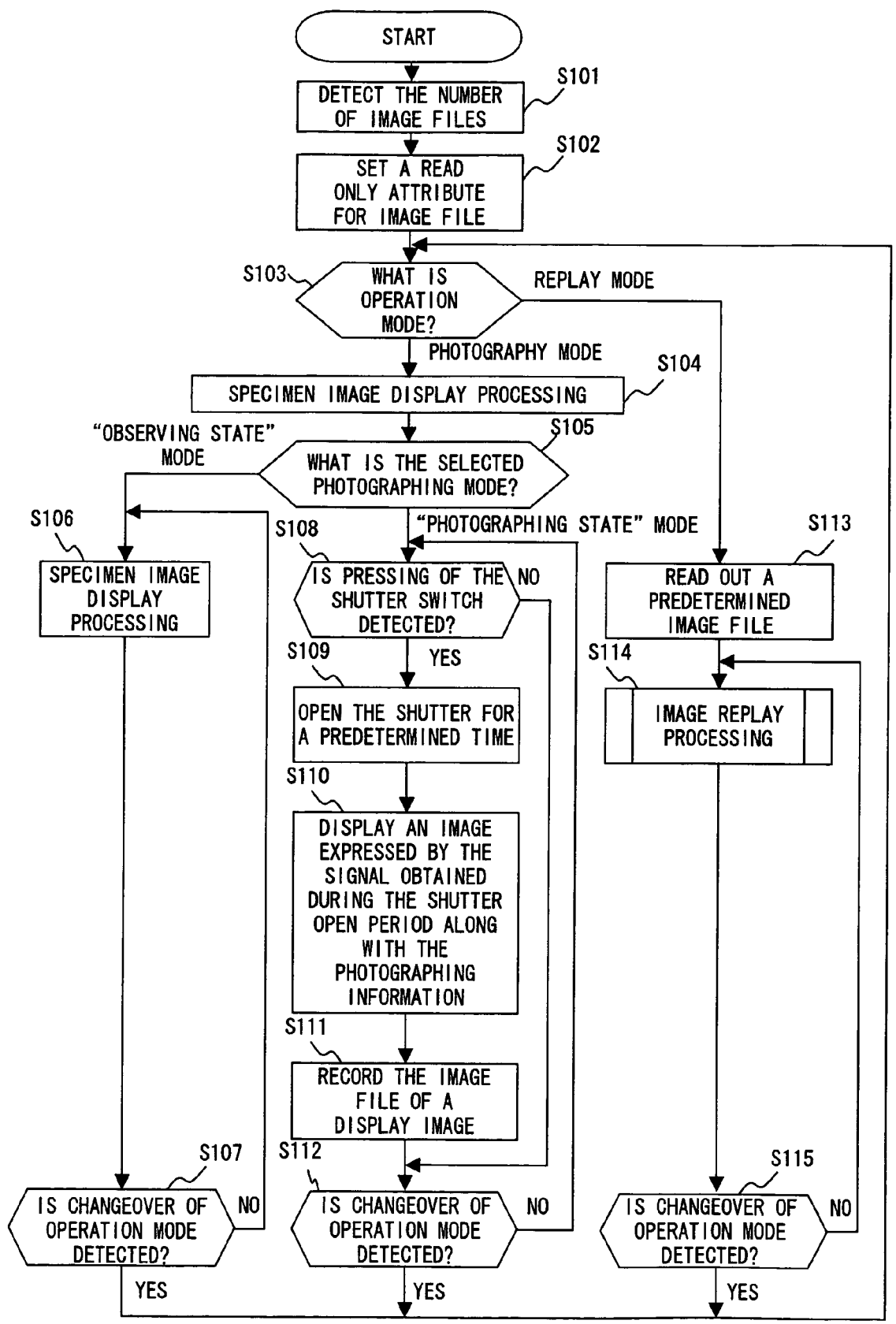
FIG. 5 is a flow chart showing a processing content of a control processing carried out by a CPU (central processing unit)

The next description is of FIG. 5, which is a flow chart showing a processing content of a control processing carried out by the CPU 201. As the power supply switch 71 is turned on to start supplying the power to the respective parts of the microscope-use digital camera 3. The CPU 201 first reads the above described program and starts executing it, thereby carrying out a control processing shown by FIG. 5.

First, S101 provides an instruction to the record count detection unit 64 to have it detect the number of images (i.e., the total number of image files) recorded by the removable media 35. The subsequent step S102 provides an instruction to the read attribute setting unit 74 so as to rewrite a file attribute of a directory entry within the removal media 35, thereby carrying out the processing of setting a read only attribute for the matching number of image files, that is, for all image files within the removal media 35.

The file once set as a read only attribute as described above is recognized as the read only attribute being valid not only at the time of a file handling by the microscope-use digital camera 3, but also at the time of a file operation by a PC, et cetera, by inserting a removal media 35, which is taken out of the microscope-use digital camera 3, into a data readout apparatus (e.g., a flexible disk drive if it is a flexible disk). Therefore, an editing operation such as a delete or change of the file is not accepted unless a processing of canceling the attribute is performed.

Then in S103, the processing of distinguishing which operation mode of the microscope-use digital camera 3 is selected by the mode switch 32 is carried out. Here, if the photographing mode is selected, the processing proceeds to S104, while if the replay mode is selected, it proceeds to S113.

In S104, a specimen image display processing is carried out. This is the processing of making the image display panel 41 display an image, as is, of the specimen 50 being currently imaged by the microscope-use digital camera 3 under the management of the CPU 201. A more detailed description is that, first, as a specimen image from the microscope main body 1 is focused on the photoelectric conversion element 20 by way of the imaging lens 55, the specimen image is converted to an electrical signal. The electrical signal is sampled at intervals of unit time by the sampling circuit 21 followed by being converted into digital data by the A/D converter 22. Subsequently, the image processing unit 23 applies a prescribed image processing to the digital data, thereby image data for an image expressing the specimen 50 is generated. As the generated image data is sent from the camera head unit 2 to the operator & display unit 6 by way of the cable 7, the CPU 201 stores the image data in the display-use RAM 200. The stored image data is read out from the display area 5 and converted to an image signal, that is, an analog signal, by the D/A converter 24. As the image signal is input to the image display panel 41, the image of the specimen 50 is displayed thereby. The processing for making the respective units of the microscope-use digital camera 3 carry out the above described processes is the specimen image display processing.

In S105, the processing of identifying which mode of the microscope-use digital camera 3 is currently selected by the mode switch 32 is carried out.

The present embodiment is configured to furnish at least two operation modes as the photographing mode for the microscope-use digital camera 3, i.e., "observation state" and "photographing state". The "observation state" mode is to display images of the specimen 50 consecutively in the image display panel 41 immediately following photographing repetitiously with the shutter 25 being held open (or it may be opened and closed in a certain time interval), thereby enabling a dynamic display of the specimen image. The "photographing state" mode is to display a specimen image at the instant the shutter switch 31 is pressed in the image display panel 41 as a still image and, at the same time, to record the image file of the aforementioned specimen image in the removable media 35.

In the processing of S105, if the "observation state" is identified as selected, the processing proceeds to S106, while if the "photographing state" mode is identified as selected, the processing proceeds to S108.

In S106, a specimen image display processing which is the same as the above described S104 is carried out.

In S107, the processing of judging whether or not an instruction to change over the microscope-use digital camera 3 to another operation mode as a result of operating the mode switch 32 is carried out. Here, if the aforementioned instruction operation is detected (i.e., the judgment result is "yes"), the processing returns to S103 for repeating the above described processes. Conversely, if the aforementioned operation instruction is not detected (i.e., the judgment result is "no"), the processing returns to S106 for carrying out the above described specimen image display processing again. By a repetition of the specimen image display processing, a dynamic display of a specimen image is accomplished by the image display panel 41.

In S108, the processing of judging whether or not a pressing operation of the shutter switch 31 is detected is carried out. Here, if the aforementioned pressing operation is detected (i.e., the judgment result is "yes"), the process proceeds to S109, while if the aforementioned pressing operation is not detected, the process proceeds to S112.

In S109, the processing of controlling the shutter 25 to open for a predetermined exposure time which is set in advance is carried out.

In S110, the processing of making the image display panel 41 display an image represented by an electrical signal output from the photoelectric conversion element 20 during the period when making the shutter 25 open by the processing of the previous step, in the same way as the specimen image display processing is carried out. Incidentally, in this event the processing of making the information display panel 42 display photographing information such as a setup state of an exposure time and an exposure correction performed for the aforementioned photographing, et cetera is also carried out.

In S111, the processing of providing an instruction to the memory read & write unit 36 to make the image file relating to the image which is displayed by image display panel 41 as a result of the processing in the previous step recorded by the removable media 35 is carried out. Note that the recording processing does not set a read only attribute for the image file as the subject of recording.

In S112, the processing of judging whether or not detecting an instruction for changing over the microscope-use digital camera 3 to another operation mode as a result of the mode switch 32 being operated is carried out. Here, if the aforementioned instruction operation is detected (i.e., the judgment result is "yes"), the processing returns to S103 to repeat the above described processes. Conversely, if the aforementioned processing is not detected (i.e., the judgment result is "no"), the processing returns to S108 for repeating a processing of detecting a pressing of the shutter switch 31.

Incidentally in the above described processing of S103, if the judgment is that the replay mode is selected, then in S113 the processing of providing an instruction to the memory read & write unit 36 to read a predetermined image file recorded by the removable media 35, here in particular an image file at the head of image files which are not given any sequence, is carried out.

In S114, an image replay processing is carried out. This processing is to make the image display panel 41 display an image expressed by an image file recorded by the removable media 35, and its details will be described later.

In S115, the processing of judging whether or not detecting an instruction for changing over the microscope-use digital camera 3 to another operation mode as a result of the mode switch 32 being operated is carried out. Here, if the aforementioned instruction operation is detected (i.e., the judgment result is "yes"), the processing returns to S103 to repeat the above described processes. Conversely, if the aforementioned processing is not detected (i.e., the judgment result is "no"), the processing returns to S114 for carrying out the image replay processing again.

The above described is the processing shown by FIG. 5.

Figure 6:
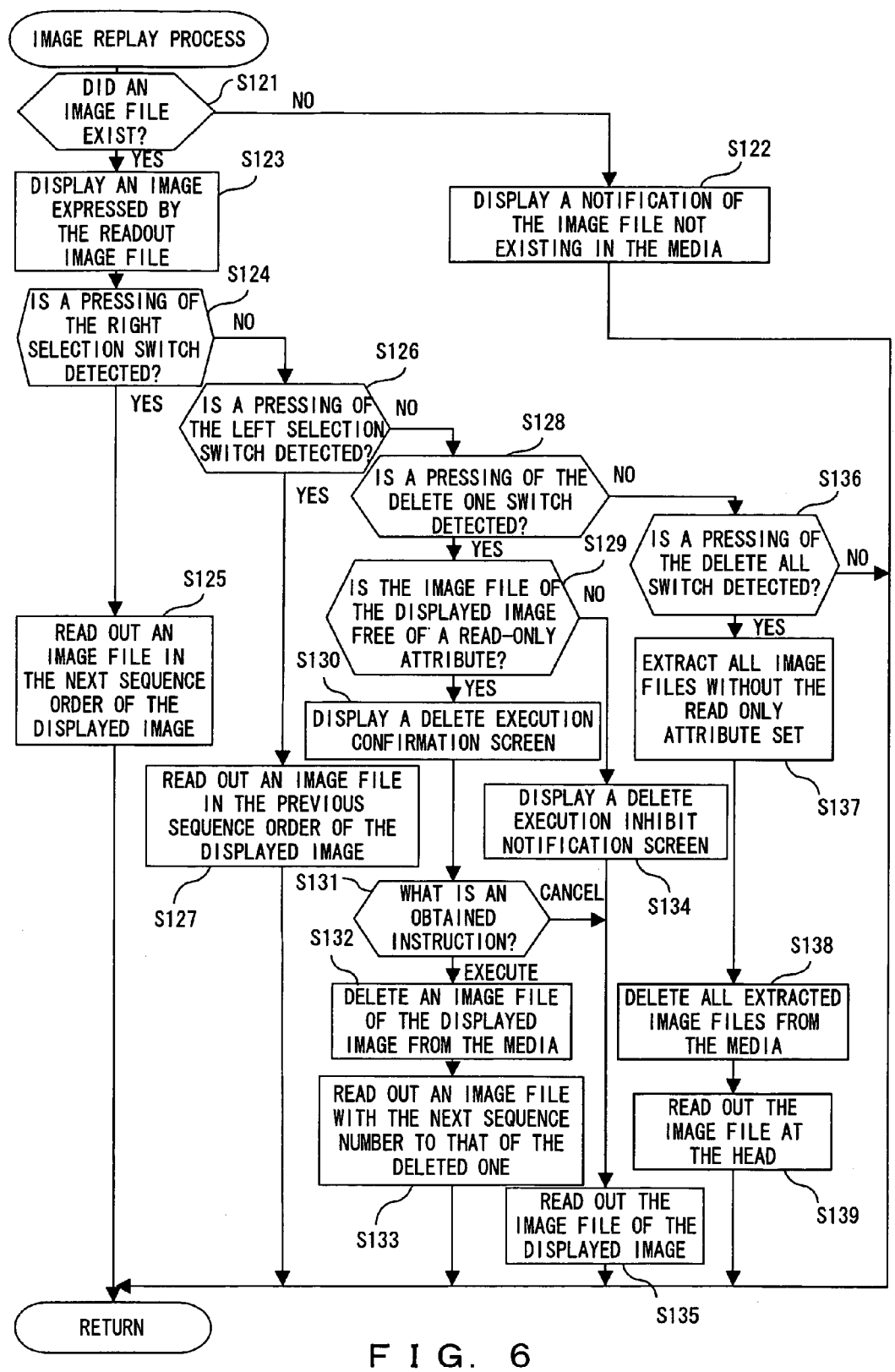
FIG. 6 is a flow chart showing a processing content of an image replay processing.

The next description is of FIG. 6 which is a flow chart showing a processing content of an image replay processing, i.e., the processing in S114 shown by FIG. 5.

First in S121, the process of judging whether or not an image file as the subject of readout existed in the removable media 35 in the processing of reading an image file out thereof which was executed immediately previously is carried out. Here, if the aforementioned image file existed (i.e., the judgment result is "yes"), the process proceeds to S123. Conversely, if the aforementioned image file does not exist (i.e., the judgment result is "no"), then in S122 the processing of making the image display panel 41 display, for a predetermined time, an image for notifying the observing person of the fact that an image file does not exist in the removable media 35, followed by finishing the image replay processing to return to the processing shown by FIG. 5 is carried out.

In S123, carried out is the processing of making the image display panel 41 display an image expressed by the image file read out by the processing of reading the image file out of the removable media 35 which was executed immediately previously. That is to take an image data stored in a prescribed format from the aforementioned image file, and temporarily store it in the RAM 200 in a prescribed format. Then, make the display area 5 read out the image data and make the D/A converter convert it into an image signal, followed by inputting the image signal to the image display panel 41 so as to display the image therein.

In S124, carried out is the processing of judging whether or not a pressing operation on the right selection switch 62 is detected. Here, if the aforementioned pressing operation is detected (i.e., the judgment result is "yes"), the process proceeds to S125, while if the aforementioned pressing operation is not detected (i.e., the judgment result is "no"), then the process proceeds to S126.

In S125, the processing of providing an instruction to the memory readout & write unit 36 and reading out an image file which has been given a sequence number immediately following the image currently displayed by the image display panel 41 from among image files recorded by the removable media 35 is carried out, followed by finishing the image replay processing to return to the processing shown by FIG. 5.

In S126, the processing of judging whether or not a pressing operation on the left selection switch 61 is detected is carried out. Here, if the aforementioned pressing operation is detected (i.e., the judgment result is "yes"), the process proceeds to S127, while if the aforementioned pressing operation is not detected (i.e., the judgment result is "no"), then the process proceeds to S128.

In S127, the processing of providing an instruction to the memory readout & write unit 36 and reading out an image file which has been given a sequence number immediately prior to the image currently displayed by the image display panel 41 from among image files recorded by the removable media 35 is carried out, followed by finishing the image replay processing to return to the processing shown by FIG. 5.

The above described processes from S124 through S127 are those of changing over a display, in the image display panel 41, of an image of an image file recorded by the removable media 35 in sequence according to the operation either of the left selection switch 61 or the right selection switch 62. Here, if a display instruction of an image immediately following the image assigned by the last sequence order as a result of an operation of the right selection switch 62 occurs, the configuration may be such that the image assigned by the first sequence order is then displayed instead. Also, if a display instruction of an image immediately prior to the image assigned as the first image in a sequence order as a result of an operation on the left selection switch 61 occurs, the configuration may be such that the image assigned as the last image of a sequence order is then displayed instead.

In S128, the processing of judging whether or not a pressing operation on the delete-one switch 72 is detected is carried out. Here, if the aforementioned pressing operation is detected (i.e., the judgment result is "yes"), the process proceeds to S129, while if the aforementioned pressing operation is not detected (i.e., the judgment result is "no"), then the process proceeds to S136.

The processes in the ensuing steps S129 through S135 are for deleting the image file of an image currently displayed in the image display panel 41 from the removable media 35. In these processes, however, if the read only attribute is set for the image file, the aforementioned image file will not be deleted.

In S129, the processing of judging whether or not the read only attribute is set for the image file of the image currently displayed in the image display panel 41 is carried out. Here, if the aforementioned attribute is unset (i.e., the judgment result is "yes"), the process proceeds to S130, while if the aforementioned attribute is set (i.e., the judgment result is "no"), then the process proceeds to S134.

In S130, the processing of superimposing a delete execution instruction confirmation screen as exemplified by FIG. 7 on the image display panel 41 is carried out. In the ensuing S131, the processing of identifying what the instruction was that the observing person gave in response to the displayed aforementioned screen is carried out.

In the processing of S131, if it is identified as an instruction for a delete execution by a pressing operation of the left selection switch 61, the process proceeds to S132, and the processing of deleting the image file of the image currently displayed by the image display panel 41 from the removable media 35 is carried out. And in the ensuing S133, the processing of providing an instruction to the memory readout & write unit 36 and reading out an image file assigned by a sequence number immediately following the one which has been deleted, followed by finishing the image replay processing to return to the processing shown by FIG. 5 is carried out.

Conversely, if it is identified as instructing a delete execution cancellation by a pressing operation of the right selection switch 62 in the processing of S131, the process proceeds to S135.

In S134, carried out is the processing of superimposing a delete execution inhibit notification screen as exemplified by FIG. 8 with the image display panel 41 for a predetermined time. A delete execution inhibit notification screen is for notifying the observing person of the fact that the read only attribute is set for the image file of the image currently displayed by the image display panel 41. Incidentally in this processing, the image file of the image currently displayed by the image display panel 41, that is, the image file set with the read only attribute is not deleted of course.

In S135, carried out is the processing of providing an instruction to the memory readout & write unit 36 and reading out the image file of the image currently displayed by the image display panel 41, followed by finishing the image replay processing to return to the processing shown by FIG. 5.

In S136, the processing of judging whether or not a pressing operation of the delete-all switch 73 is detected is carried out. Here, if the aforementioned pressing operation is detected (i.e., the judgment result is "yes"), the process proceeds to S137, while if the aforementioned pressing operation is not detected (i.e., the judgment result is "no"), then the image replay processing ends and the process returns to the processes shown by FIG. 5.

In S137, the processes of providing an instruction to the memory readout & write unit 36 and extracting an image file with a read only attribute not being set from among the image files recorded by the removable media 35 is carried out; and in the ensuing S138, the processes of deleting all the extracted image files only from the removable media 35 is carried out. Therefore an image file with a read only attribute set remains in the removable media 35 instead of being deleted.

In S139, the processing of providing an instruction to the memory readout & write unit 36 and reading out an image file which is has the head sequence number from among the image files recorded by the removable media 35 is carried out, followed by finishing the image replay processing to return to the processing shown by FIG. 5.

The above described processing is the image replay processing.

The CPU 201 executing the above described processes shown by FIGS. 5 and 6 enable the microscope-use digital camera 3 to carry out a management of image files in the removable media 35.

The above described microscope-use digital camera 3 according to the present embodiment provides the benefits as follows.

First, as the power supply switch 71 is turned on to start the power supply to the respective parts of the microscope-use digital camera 3, the read only attribute is automatically set for all the image files recorded by the removable media 35 at that point. Therefore, there is no possibility of erroneously deleting the images recorded by the removable media 35 at the time of starting the supply of power. This saves the trouble of the observing person setting up the read only attribute for image files individually, hence improving the operability. Furthermore, if one removable media 35 is shared by a number of persons, there is no possibility of erroneously deleting an image another person photographed and saved previously, thus enabling such sharing without cause for concern. And if one's own removable media 35 is borrowed by another person, there is no possibility of the other person erroneously deleting an image, thus there is no cause for concern.

Moreover, if a large number of images are recorded by a storage medium, by a use of the delete-all function of the microscope-use digital camera 3, all of only the images recorded anew after the supply of power is started immediately prior thereto are deleted, thus making a disposition of image files easy.

Note that the present embodiment may also be configured to install, in the memory apparatus 34, a stationary storage medium such as a hard disk apparatus and a semiconductor memory in place of the removable media 35 to store images in such a storage medium. Such a configuration eliminates a detachably attachable mechanism for the removable media 35, thereby making the entirety of the microscope-use digital camera 3 simplified and compact.

Second Embodiment

This embodiment is configured to set the read only attribute for a displayable image file in a image display panel 41 as an image among the data file recorded by a removable media 35 at the time when a power supply switch 71 is turned on to start supplying the power to respective parts of a microscope-use digital camera 3, in an observation system including the microscope-use digital camera 3 shown by FIG. 1.

The first embodiment assumes that image files only are recorded by the removable media 35. Comparably, if an observing person stores a memo, et cetera, in the removable media 35 as a text file for instance, such a data file will never be displayed as an image by the image display panel 41 of the microscope-use digital camera 3. Accordingly, such a file is not set with the read only attribute at the start of power supply. For this, a CPU 201 is made to carry out the processing shown by FIG. 9A in lieu of the processing of S102 shown by FIG. 5.

Figure 9A:
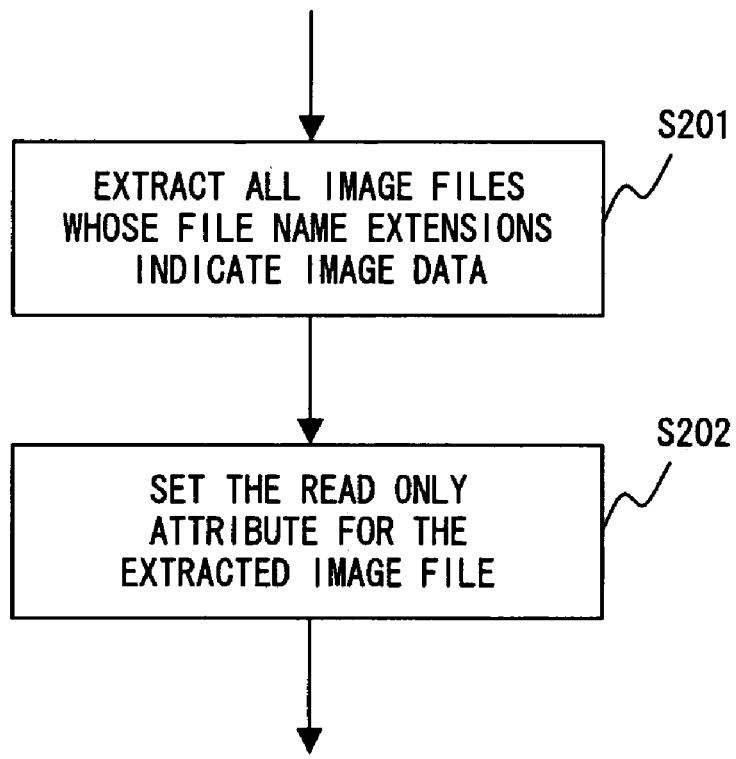
FIG. 9A shows a changed part in a second embodiment of a control processing shown by FIG. 5.

Let the processing of FIG. 9A be described.

In S201 proceeding from the processing of S101 shown by FIG. 5, the processing of providing an instruction to the memory readout & write unit 36 and extracting each data file (e.g., a data file whose file name is given the extension "jpg" indicating an image file by the data format conforming to the above noted JPEG system) whose file name is given an extension indicating the stored data being image data, from among the data files recorded by the removable media 35 is carried out.

In S202, the processing of providing an instruction to a read attribute setting unit 74, rewriting a file attribute of a directory entry within the removable media 35 and setting up the read only attribute for the image file extracted by the processing in the previous step is carried out, followed by proceeding to the processing in S103 shown by FIG. 5.

Figure 9B:
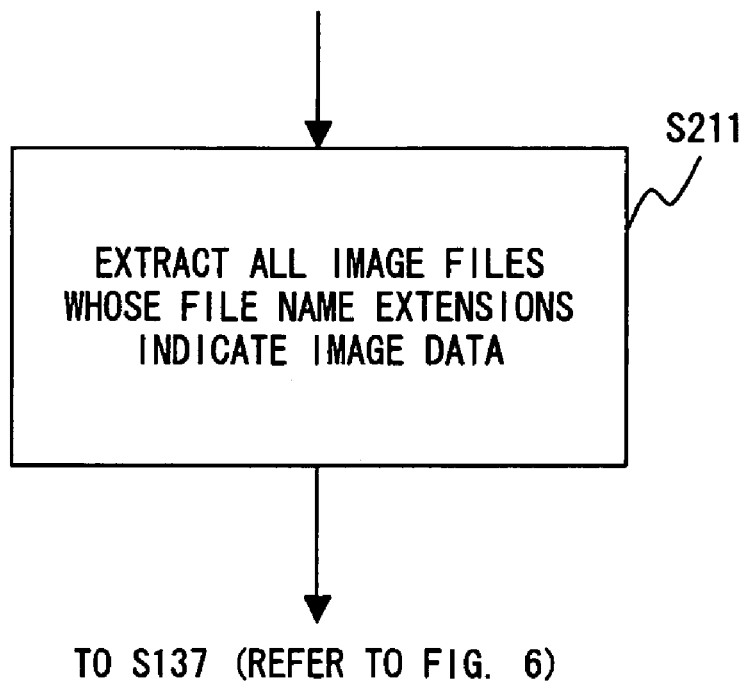
FIG. 9B shows a changed part in the second embodiment of an image replay processing shown by FIG. 6.

Incidentally the present embodiment is configured to, when detecting a pressing operation of the delete-all switch 73, delete all image files displayable, as images, in the image display panel 41 of the microscope-use digital camera 3 and at the same time not set with a read only attribute, among the data files recorded by the removable media 35. Specifically, the processing of S211 shown by FIG. 9B is inserted between the processing of S136 and that of S137 both shown by FIG. 6, and the CPU 201 is made to carry out the processing.

The processing of S211 is the same as the above described S201 shown by FIG. 9A, carrying out the processing of providing an instruction to the memory readout & write unit 36 and extracting each data file whose file name is given an extension indicating the stored data being image data from among the data files recorded by the removable media 35. And in the ensuing step S137 shown by FIG. 6, the processing of extracting an image file without a read only attribute being set from among the image files extracted by the processing in S211 is carried out. This configuration eliminates a possibility of deleting data files already recorded by the removable media 35 at the time of power supply start including files not expressing the images such as a text file.

The above described microscope-use digital camera 3 according to the present embodiment sets up the read only attribute for only an image file displayable by the microscope-use digital camera 3 itself among the data files recorded by the removable media 35, thereby reducing the attribute setup working. As a result, if a removable media 35 is of a large capacity and stores a vast number of data files, a processing volume of the read only attribute setup processing is reduced, hence shortening the time required for the microscope-use digital camera 3 processing at the power supply start.

Third Embodiment

This embodiment is configured to rewrite a file attribute of a directory entry within a removable media 35 and at the same time make a list for managing whether or not each image file is read-only, to store in the RAM of the CPU 201 at the time when a power supply switch 71 is turned on to start supplying the power to respective parts of a microscope-use digital camera 3, in an observation system including the microscope-use digital camera 3 shown by FIG. 1. And later judgment for deleting an image file will be made based on the list.

Figure 10:
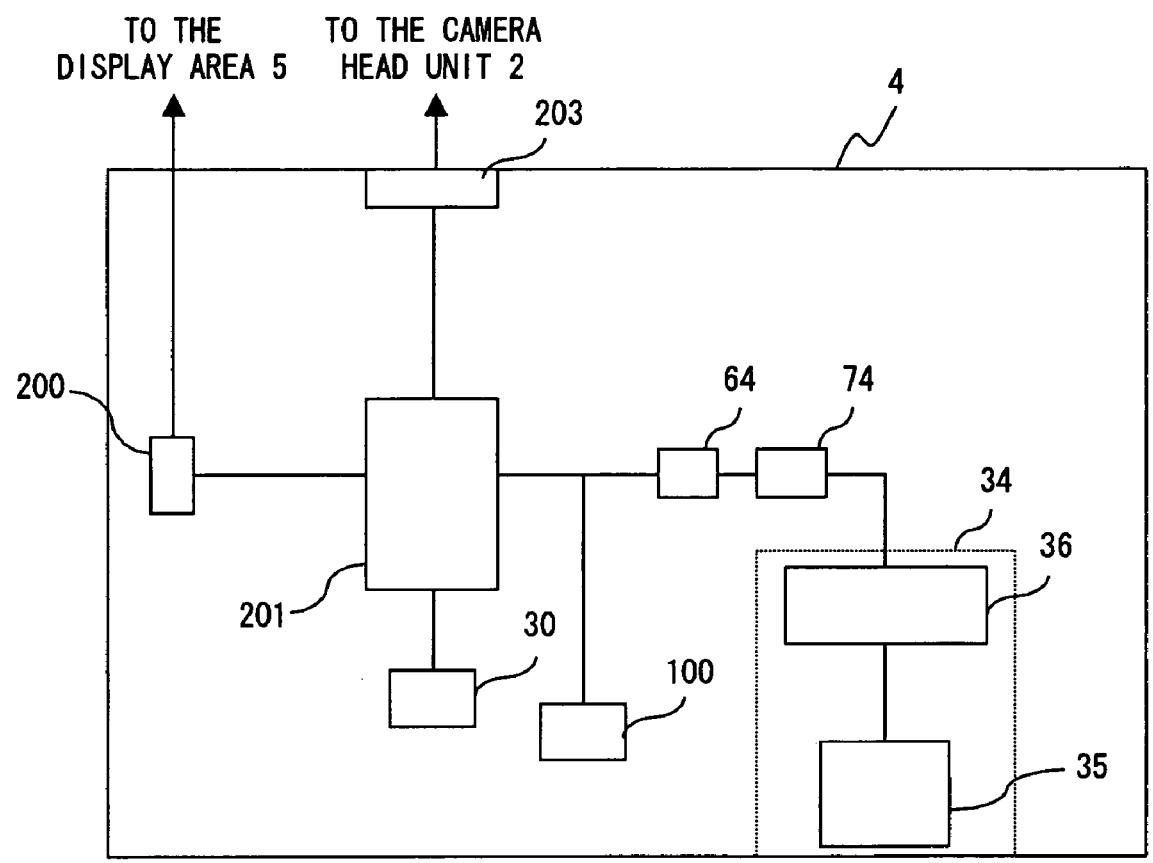
FIG. 10 shows an electrical configuration of an operator area 4 according to a third, a seventh and an eighth embodiment.

FIG. 10 shows an electrical configuration of operator area 4 according to the present embodiment. Note that components the same as those of the first embodiment, as shown by FIG. 1, are assigned the same numerals in FIG. 10.

The electrical configuration of the operator area 4 according to the present embodiment differs from the one according to the first embodiment in that a file information list generation unit 100 is added between a CPU 201 and a record count detection unit 64.

As the power supply switch 71 is turned on to start supplying the power to respective parts of the microscope-use digital camera 3, the file information list generation unit 100 makes a list of all image files recorded by the removable media 35 to store in the internal RAM of the CPU 201. And judgment for a presence or absence of a read attribute setup for each image file at the time when the microscope-use digital camera 3 deletes an image file is made based on this file.

FIG. 11 shows an example of a file information list generated by the file information list generation unit 100.

In the file information list shown by FIG. 11, "ID" (i.e., an identifier) which is a number assigned to each data file individually, "file name" of a data file and "attribute" which is assigned to a data file are correlated with one another. Here, when a data file is set with the read only attribute, the "attribute" in this list is set to "1". Conversely, if the read only attribute is not set (i.e., may be deleted), the "attribute" in this list is set to "0". Referring to FIG. 11, for example, the file name of a data file whose ID is "1" is "Pic001.jpg". Since the attribute of the data file is set to "1", it is indicated that the data file has the read only attribute set.

Incidentally the "attribute" field is "1" in the list shown by FIG. 11, indicating that all the data files shown in the list are set with the read only attribute.

Figure 12A:
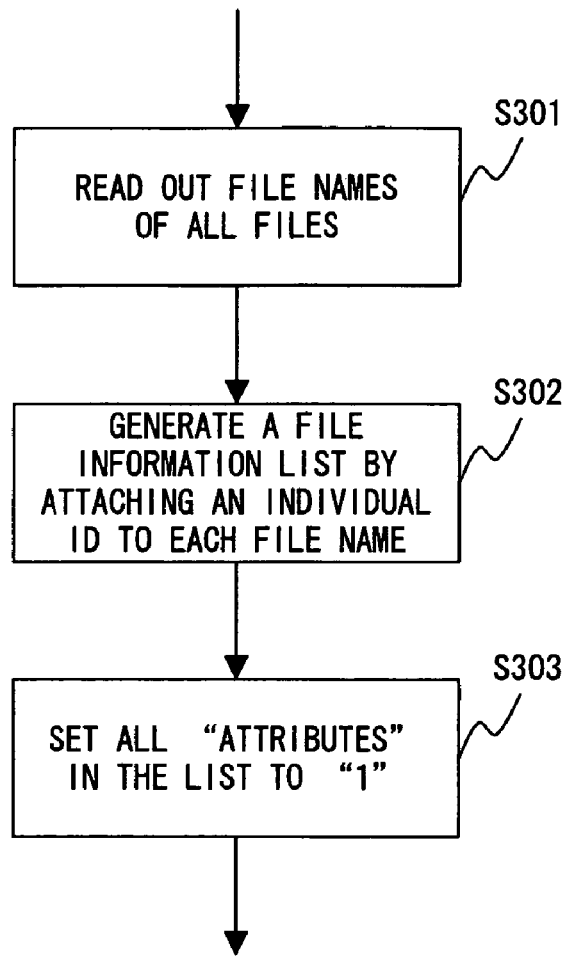
FIG. 12A shows a changed part in a third embodiment of a control processing shown by FIG. 5.

The next description is of FIG. 12A. The processing shown by FIG. 12A is a control processing for making a file information list. This processing is inserted between the processes of S102 and S103 shown by FIG. 5, and is to be carried out by the CPU 201.

In S301, following S102 shown by FIG. 5, the processes of providing an instruction to the memory readout & write unit 36 and reading all the file names of data files recorded by the removable media 35 are carried out.

In S302, the processes of providing an instruction to the file information list generation unit 100 and making a file information list by correlating an individual ID for each file name obtained by the processing in the previous step is carried out. The made file information list is retained by the internal RAM of the CPU 201.

In S303, the processing of setting all "attribute" fields of the file information list retained by the internal RAM of the CPU 201 to "1", thereby setting the read only attributes, in the aforementioned list, for all the data files whose file names are indicated therein is carried out. That is followed by proceeding to S103 shown by FIG. 5, and carrying out the ensuing processes, thereby rewriting the file attribute of the directory entry within the removable media 35 and setting the read only attribute for all the image files within the removable media 35. By this, the read only attribute identifies between the removable media 35 and the file information list.

Note that in the ensuing processing, that is, the processing of recording a specimen image carried out according to a pressing operation of the shutter switch 31, an image file is recorded in the removable media 35, but a data handling for the file information list is not carried out. Therefore, the file information list will never be updated after the processing shown by FIG. 12A.

Figure 12B:
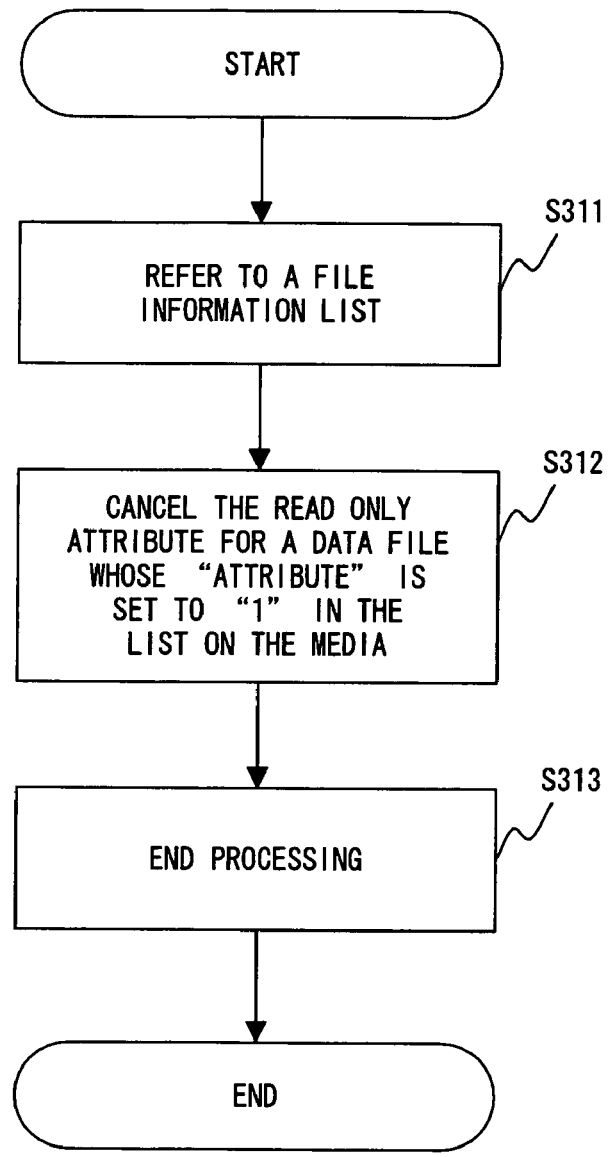
FIG. 12B is a flow chart showing a processing content of a control processing at power off.

The next description is of FIG. 12B which is a flow chart showing a processing content of a control processing at power off that is carried out when the CPU 201 detects the power supply switch 71 being turned off.

First, in S311, the processing of referring to the file information list retained by the internal RAM of the CPU 201, and in the ensuing S312 the processing of canceling the read only attribute, to allow a delete, for a data file whose "attribute" is set to "1" in the aforementioned list, that is, for a data file set with the read only attribute therein is carried out.

In S313, the various processes for shutting off the power supply to the respective parts of the microscope-use digital camera 3 are carried out, and with this the processing of FIG. 12B ends. Here, the present embodiment is configured to retain the file information list in the internal RAM of the CPU 201, and therefore the file information list disappears with a shutting off of the power supply.

The above described processing is the control processing at the power off. If a file operation is carried out following the above processing by taking the removable media 35 out of the microscope-use digital camera 3, inserting it into a data readout apparatus (e.g., a flexible disk drive if it is a flexible disk) and performing a delete of, or a data write to, a data file, et cetera, on a PC, then it is possible to carry out the aforementioned file operation on the aforementioned PC, since the read only attribute is now canceled for each data file within the removable media 35.

The above described microscope-use digital camera 3 according to the present embodiment is configured to cancel the read only attribute, which was set for each data file recorded by the removable media 35 at the power supply start (i.e., when turning on the power supply switch 71) to the respective parts of the microscope-use digital camera 3, at the end of supplying the aforementioned power (i.e., when turning off the power supply switch 71). Therefore, when using the removable media 35 in another apparatus such as a PC later, a setup change of the read only attribute for each data file becomes unnecessary, hence further improving the operability.

Figure 12C:
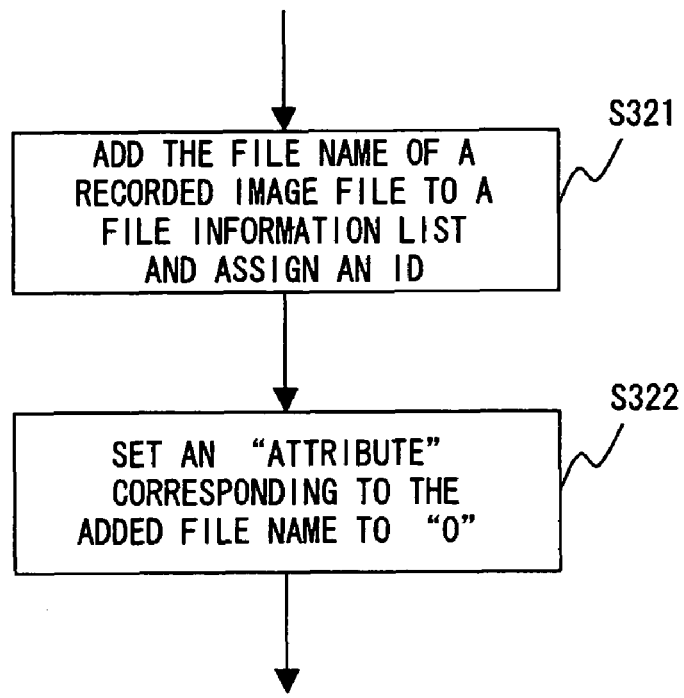
FIG. 12C shows a changed part in a modification of the third embodiment of a control processing shown by FIG. 5.

Note that the present embodiment may also be configured to insert the processing shown by FIG. 12C between the processes of S111 and S112 shown by FIG. 5 so as to be carried out by the CPU 201.

Describing the processing of FIG. 12C, in S321, the processes of adding the file name of a recorded image file to the file information list and at the same time assigning an individual ID to the aforementioned file name in the aforementioned file information list, following the processing of S111 shown by FIG. 5 in which an image file is recorded by the removable media 35 is carried out. Then in the following S322, the processing of not setting a read only attribute (i.e., so as to allow a delete) by setting the "attribute", to "0", corresponding to a file name added in the aforementioned file information list is carried out, followed by proceeding to the processing of S112 shown by FIG. 5.

Making the CPU 201 carry out the processing shown by FIG. 12C enables the management of data files recorded by the removable media 35 by using the file information list, thereby making the aforementioned management easy.

Figure 12D:
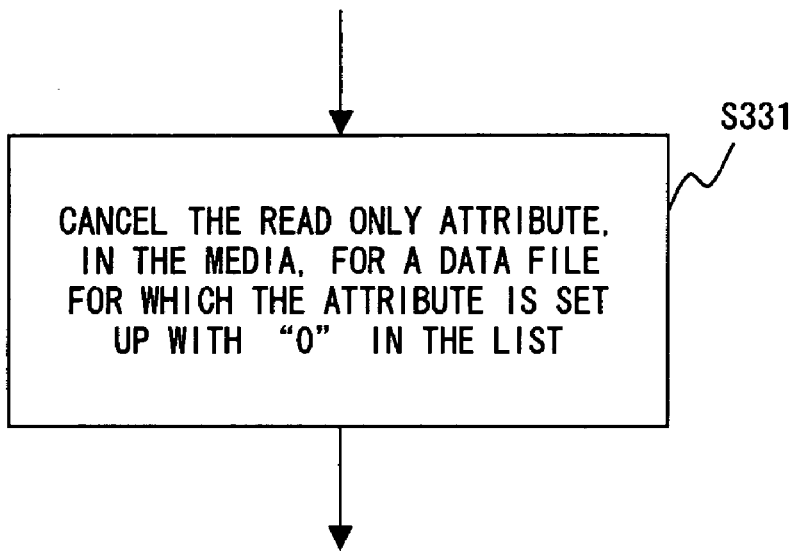
FIG. 12D shows a changed part in a modification of the third embodiment of a control processing at power off shown by FIG. 12B.

Furthermore, the configuration may be such as to make the CPU 201 not only carry out the processing shown by FIG. 12C but also replace the processing of S312 shown by FIG. 12B with that of S331 shown by FIG. 12D. That is, to carry out the processing of canceling the read only attribute, so as to allow a delete, for a data file for which the "attribute" is set to "0" in the file information list, that is, the file for which a read only attribute is not set.

In such a case, if the microscope-use digital camera 3 provides the function for enabling an observing person to set each data file with the read only attribute for example, the configuration is such as to make the CPU 201 carry out the processing of setting up the "attribute" corresponding to a data file with "1" in the file information list for the aforementioned data file which the observing person sets with the read only attribute by using the aforementioned function. By this configuration, the read only attribute within the removable media 35 is reflected, at the time of turning the power supply switch 71 off, to the data file for which the observing person sets the read only attribute as well as each data file recorded by the removable media 35 at the time of turning the power supply switch 71 on, thereby retaining the attribute even after the end of supplying the power.

And the present embodiment may be configured to store the file information list in the removable media 35 in lieu of making the internal RAM of the CPU 201 retain it.

In such a case, the relationship between file information described in a file information list and a data file actually recorded by the removable media 35 is always the same, without inconsistency, even if an observing person possessing a plurality of removable media 35 performs the observation and photographing operations while changing the removable media 35 frequently. Therefore, there is no need to turn the power of the microscope-use digital camera 3 off and then on by operating the power supply switch 71 every time the inserted removable media 35 are changed.

Fourth Embodiment

This embodiment is configured to set the read only attribute at the time of inserting a removable media 35 into a microscope-use digital camera 3 for a data file recorded thereby, in an observation system including the microscope-use digital camera 3.

Figure 13:
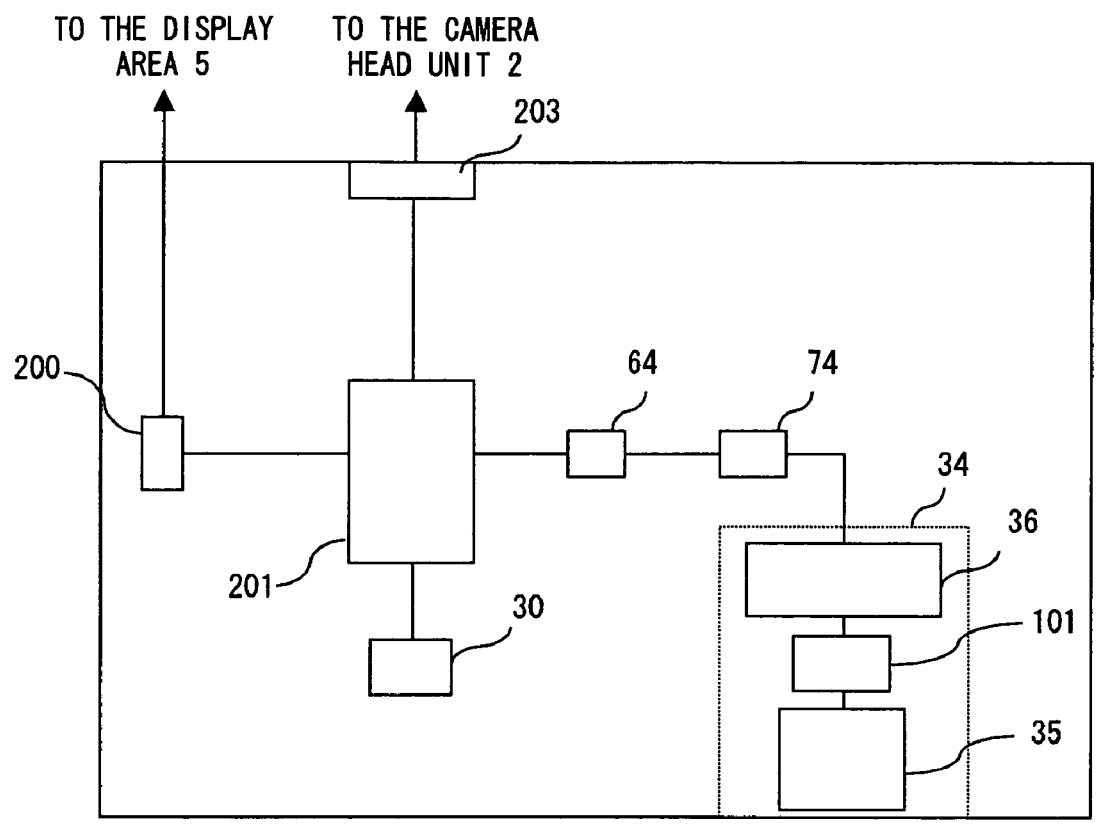
FIG. 13 shows an electrical configuration of an operator area according to a fourth and sixth embodiments.

FIG. 13 shows an electrical configuration of an operator area 4 according to the present embodiment. Incidentally in FIG. 13, the components the same as those of the first embodiment, as shown by FIG. 3B, are assigned the same reference numerals.

The electrical configuration of the operator area 4 according to the present embodiment differs from that of the first embodiment is that the former comprises a media detector 101 within a memory apparatus 34.

The media detector 101 is for detecting a presence or absence of a removable media 35 within a memory apparatus 34. As the media detector 101 detects an inserted removable media 35, the detection result is communicated to the CPU 201 which is configured to monitor the media detector 101 constantly, and starts the execution of the control processing shown by FIG. 5 every time the detection result is obtained from the media detector 101. By this, the read only attribute is set for a data file recorded by the removable media 35 at the time of inserting it into the microscope-use digital camera 3.

The above described microscope-use digital camera 3 according to the present embodiment is configured to set the read only attribute for a data file within a removable media 35 in response to the insertion thereof. By this configuration, even if a removable media 35 is changed while the power supply switch is turned on and the microscope-use digital camera 3 is in operation, the read only attribute is immediately set for a data file already recorded by the post-change removable media 35. Therefore, there is no concern over the data being erroneously deleted hence making the management of the data file easy.

Fifth Embodiment

This embodiment is configured to enable an observing person to select whether or not the read only attribute is to be set for a data file recorded by a removable media 35 at the time when starting the supply of power to the respective parts of a microscope-use digital camera 3 in an observation system including the microscope-use digital camera 3.

The description is of FIG. 14. The processing shown by FIG. 14 is a control processing for enabling the observing person to select whether or not the read only attribute is to be set. As the power supply switch 71 is turned on to start supplying the power to the respective parts of the microscope-use digital camera 3, the CPU 201 carries out the processing shown by FIG. 14 in lieu of the control processing shown by FIG. 5.

Figure 15:
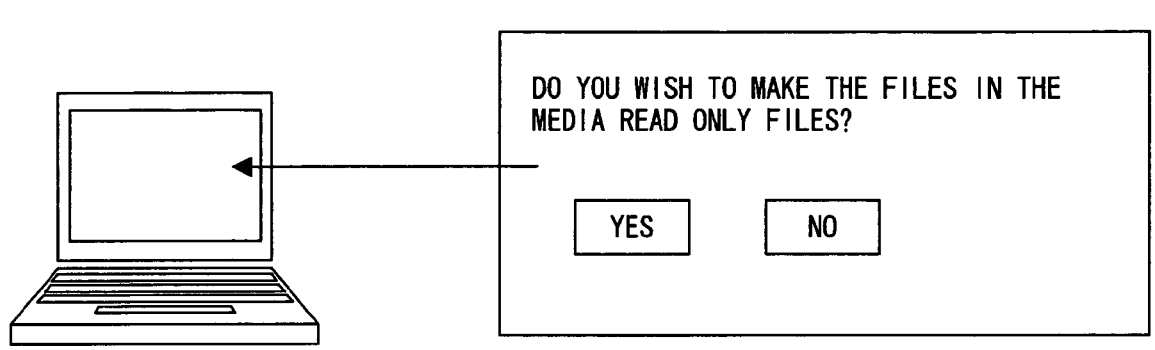
FIG. 15 shows an example of a read only attribute setup selection screen.

Referring to FIG. 14, first in S501, the processing of making the image display panel 41 display a read only attribute setup selection screen, as exemplified by FIG. 15, in superimposition is carried out. In the ensuing S502, the processing of identifying what the instruction is that has been performed by the observing person according to the aforementioned selection screen is carried out.

In the processing of S502, if the identification is of the selection of a read only attribute set by a pressing operation of the left selection switch 61, the process proceeds to S101 shown by FIG. 5 and starts the processing of setting the read only attribute for a data file recorded by the removable media 35 at that point in time. Conversely, if the identification in the processing of S502 is of the selection of not setting a read only attribute by a pressing operation of the right selection switch 62, then the process proceeds to S103 shown by FIG. 5 and the processing shown by FIG. 5 is carried out without executing the processing of setting the read only attribute.

The above described microscope-use digital camera 3 according to the present embodiment enables the observing person to select the cancellation of the read only attribute setup function which is carried out automatically by the microscope-use digital camera 3. Therefore, the observing working of the observing person is not delayed by canceling the aforementioned setup function if a read only attribute setup is not necessary as in the case of one observing person continuing to use a single removable media 35 for instance, thereby relieving the observing person of a feeling of cumbersomeness.

Incidentally, in the observing system shown by FIG. 1 including the microscope-use digital camera 3 which has the electrical configuration of an operator area 4 shown by FIG. 13, the configuration may be such that the CPU 201 starts to carry out the processing shown by FIG. 14 in lieu of the control processing shown by FIG. 5 when a detection of the insertion of the removable media 35 is obtained from the media detector 101. This configuration enables the observing person to select whether or not the read only attribute is to be set for a data file recorded by the removable media 35 at the time of inserting it to the microscope-use digital camera 3.

Sixth Embodiment

This embodiment is configured to not execute a formatting if a data file set with the read only attribute exists within a removable media 35 in the case of a microscope-use digital camera 3 providing a format (i.e., an initialization of the media) function for the removable media 35 in an observation system including the microscope-use digital camera 3 shown by FIG. 1 or 13.

Figure 16A:
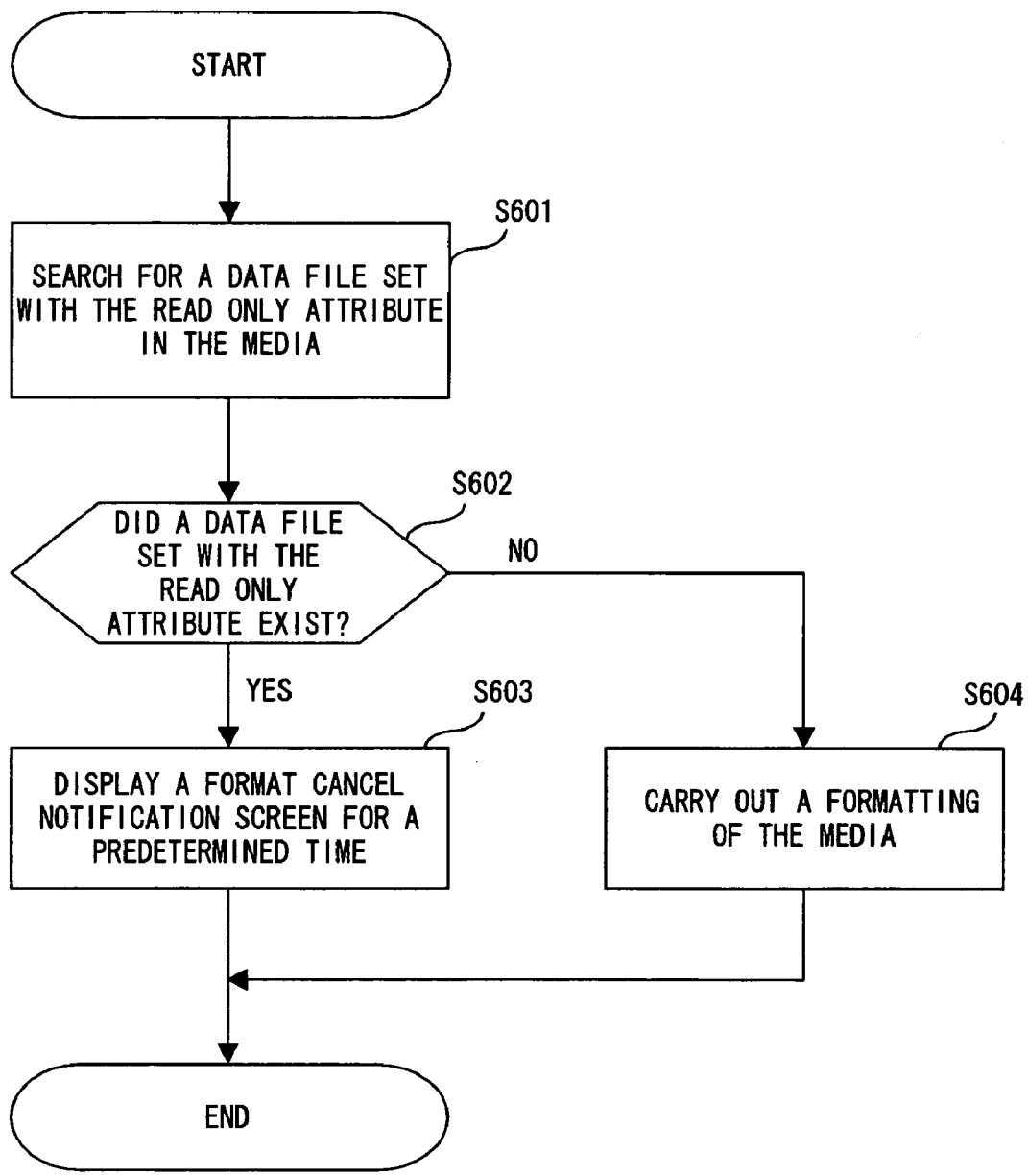
FIG. 16A shows a control processing for formatting a removable media.

The following description is of FIG. 16A. The processing shown by FIG. 16A is a control processing carried out by the CPU 201 for formatting the removable media 35. This processing starts when the observing person provides an instruction, by operating the operator area 4 of the microscope-use digital camera 3 for executing a formatting.

First in S601, carried out is the processing of providing an instruction to the memory readout & write unit 36 and searching the removable media 35 for a data file with the read only attribute set. In the ensuing S602, the processing of judging whether or not a data file with the read only attribute set exists is carried out. Here, if the judgment is that a data file with the read only attribute set exists (i.e., the judgment result is "yes"), the process proceeds to S603. Conversely, if the judgment is that a data file with the read only attribute set does not exist (i.e., the judgment result is "no"), the process proceeds to S604.

Figure 17:
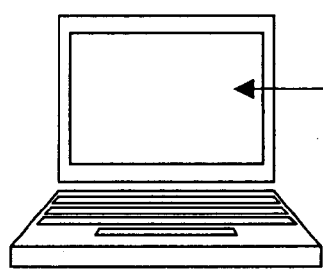
FIG. 17 shows an example of a format cancellation notification screen.

In S603, the processing of making the image display panel 41 display the format cancellation notification screen as exemplified by FIG. 17 in superimposition is carried out, thereby notifying the observation person that the instructed formatting is not carried out, followed by ending the processing shown by FIG. 16A.

In S604, the processing of carrying out a formatting of the removable media 35, followed by ending the processing shown by FIG. 16A is carried out.

The above described microscope-use digital camera 3 according to the present embodiment is configured to inhibit a use of the formatting function of the microscope-use digital camera 3 for the removable media 35 if the read only attribute is set for a data file recorded thereby at the time of starting the supply of power to the respective parts of the microscope-use digital camera 3. Therefore, there is no longer a possibility of accidentally formatting a removable media 35 despite a data file with the read only attribute set existing, thus resulting in improving the convenience of file arrangement.

Note that the present embodiment may be configured to enable the observing person to select whether or not to carry out a formatting of a removable media 35 if a data file with the read only attribute set exists therein. In order to achieve this, the configuration is such as to carry out the processing shown by FIG. 16B in lieu of the processing of S603, if the judgment result of S602 shown by FIG. 16A is "yes".

Figure 16B:
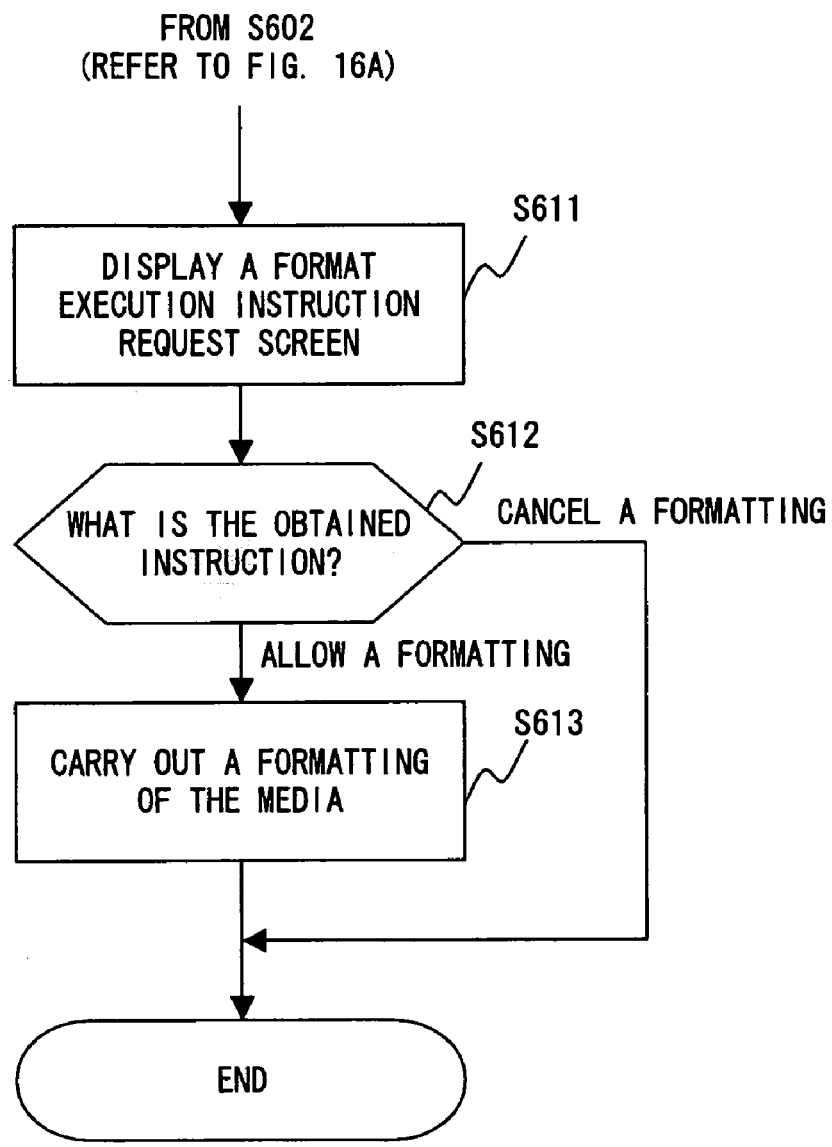
FIG. 16B shows a changed part in a modification of the sixth embodiment of a control processing shown by FIG. 16A.

Describing the processing shown by FIG. 16B, first in S611, the processing of making the image display panel 41, display a screen, in superimposition, requesting the observing person instruct or select whether or not to permit a formatting is carried out. Subsequently in S612, the processing of identifying what the instruction was according to the operation of the observing person on the aforementioned displayed screen is carried out.

In the processing of S612, if identified as an instruction to allow a formatting as a result of the operation on the operator area 4, then S613 carries out the processing of formatting the removable media 35, followed by ending the processing shown by FIG. 16B. Conversely, if identified as an instruction to not allow a formatting (i.e., cancel) by operating on the operator area 4, the processing of FIG. 16B ends without formatting the removable media 35.

By this configuration, even if a data file set with the read only attribute exists within the removable media 35, carrying out a formatting thereof is enabled when the observing person judges that the data file is not necessary.

Seventh Embodiment

This embodiment is configured to make a list and store it in the internal RAM of a CPU 201, in the same way as exemplified by FIG. 11, for managing whether or not each image file is a read only, when a power supply switch 71 is turned on to start the supply of power to the respective parts of a microscope-use digital camera 3, in an observation system shown by FIG. 1 including the microscope-use digital camera 3 which has an electrical configuration of an operator area 4 shown by FIG. 10. And to judge the possibility of deleting an image file based on the list. The above described operation is the same as the third embodiment, except that the present embodiment does not rewrite a file attribute within a removable media 35 at the time of the starting to supply power.

Then the description is of FIG. 18A. The processing shown by FIG. 18A is a control processing for making a file information list exemplified by FIG. 11 without rewriting a file attribute within a removable media 35. As the power supply switch 71 is turned on to start supplying the power to the respective parts of the microscope-use digital camera 3, the CPU 201 carries out the processing shown by FIG. 18A in lieu of the control processing shown by FIG. 5.

In S701, the processing of providing an instruction to the memory readout & write unit 36 to have all file names of data files recorded by the removable media 35 read out is carried out.

In S702, the processing of providing an instruction to the file information list generation unit 100 to have a file information list generated by correlating an individual ID with each file name obtained by the processing in the previous step is carried out. The thus made file information list is retained by the internal RAM of the CPU 201.

In S703, the processing of making all "attribute" fields "1" in the file information list retained by the internal RAM of the CPU 201 is carried out, thereby setting the read only attribute, in the file information list, for all data files whose files names are shown in the aforementioned list, followed by proceeding to the processing of S103 shown by FIG. 5.

Figure 18B:
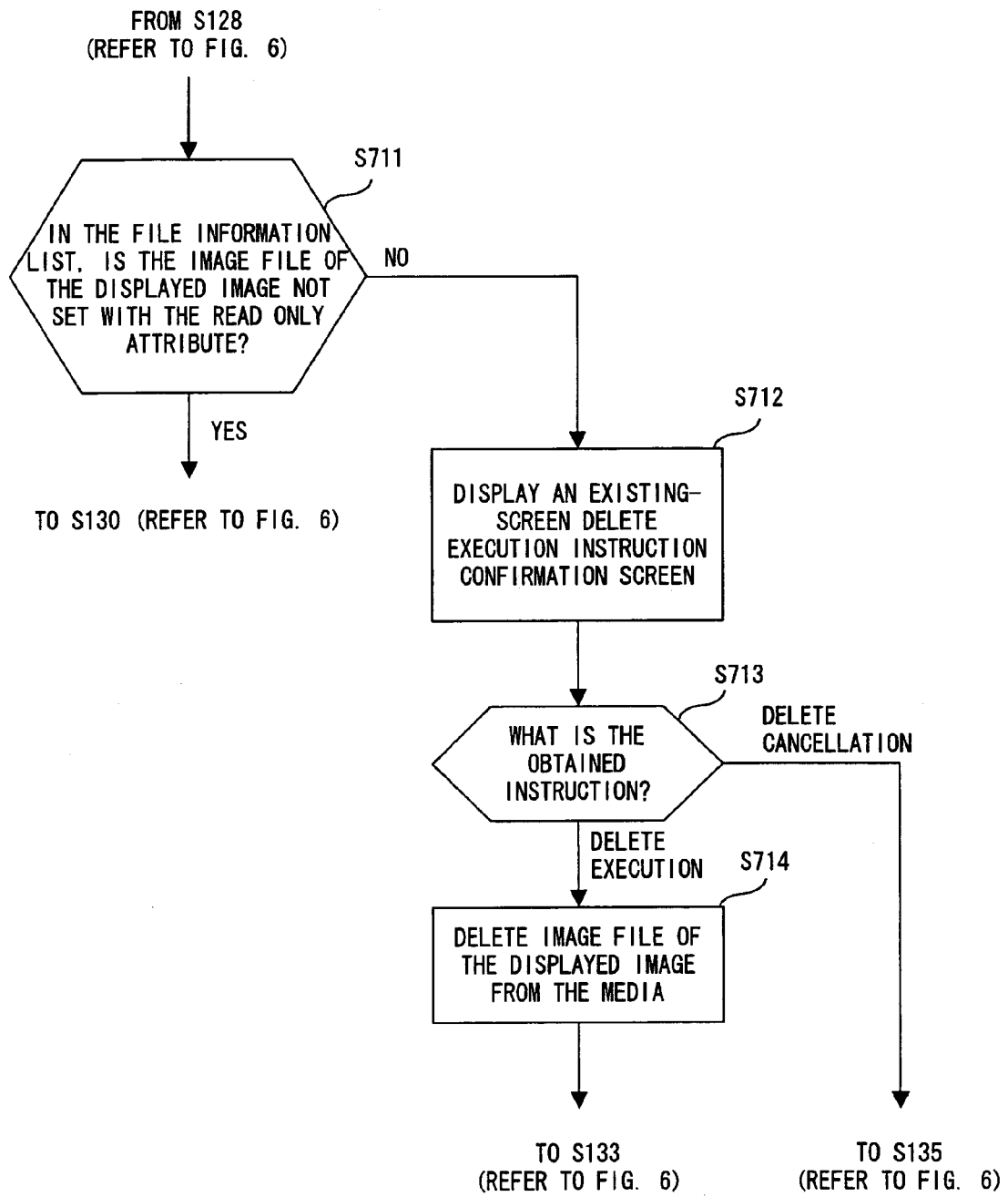
FIG. 18B shows a changed part (part 1) in the seventh embodiment of an image replay processing shown by FIG. 6.
Figure 18C:
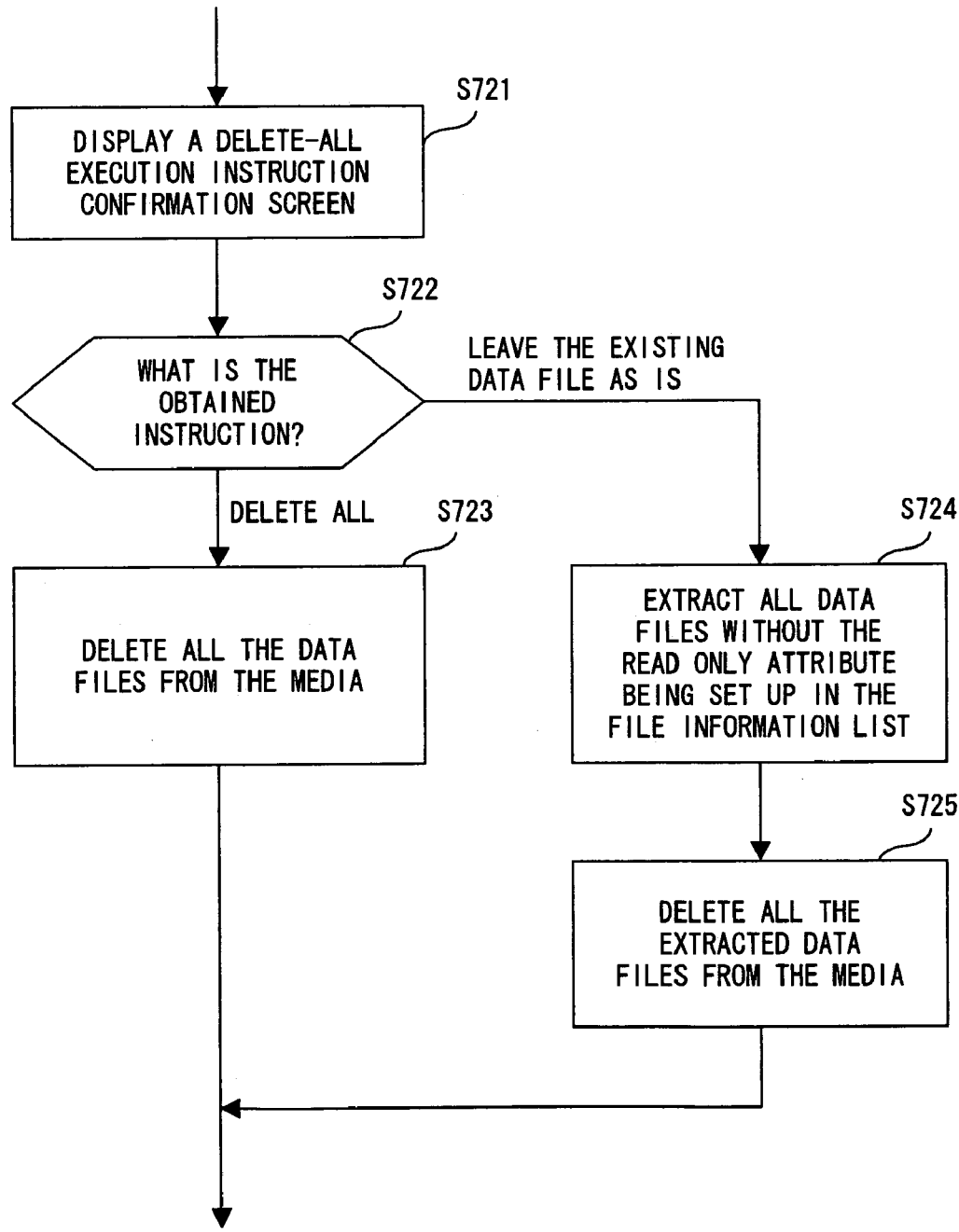
FIG. 18C shows a changed part (part 2) in the seventh embodiment of an image replay processing shown by FIG. 6.

In the ensuing process, basically the same processes as those shown by FIGS. 5 and 6 are carried out, except that, if a pressing operation of the delete-one switch 72 is detected in the S128 shown by FIG. 6, the processing shown by FIG. 18B is carried out in lieu of that of S129. Furthermore, if a pressing operation of the delete-all switch 73 is detected in S136, the processing of FIG. 18C is carried out in lieu of the processes of S137 and S139.

The first description is of the processing shown by FIG. 18B. If the judgment result in S128 shown by FIG. 6 is "yes", then in S711, the processing of judging whether or not the read only attribute is set, in the file information list, for the image file of the image currently displayed in the image display panel 41 is carried out. Here, if the aforementioned attribute is not set (i.e., the judgment result is "yes"), the process proceeds to S130 shown by FIG. 6. Conversely, if the aforementioned attribute is set (i.e., the judgment result is "no"), the process proceeds to S712.

Figure 19A:
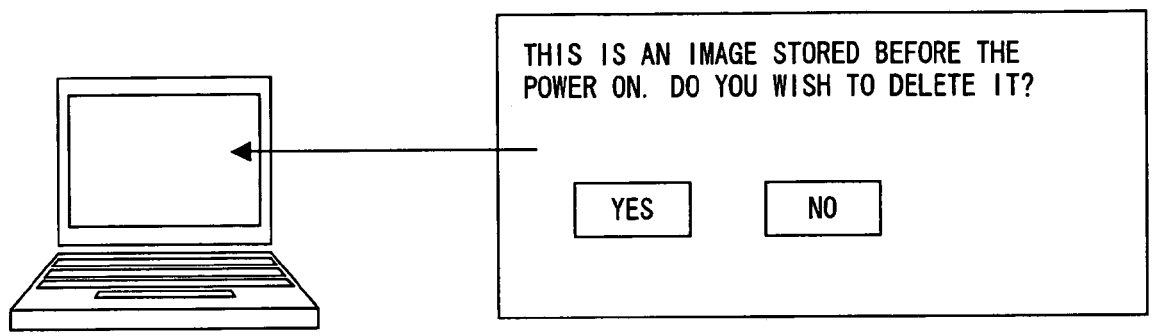
FIG. 19A shows an example of an existing image delete execution instruction confirmation screen.
Figure 19B:
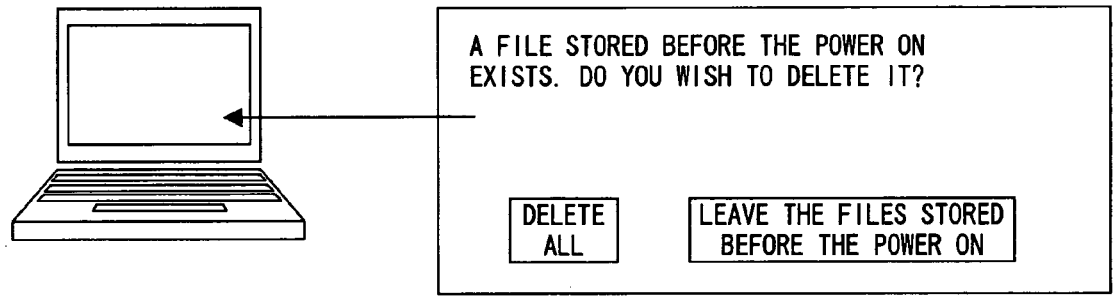
FIG. 19B shows an example of an all delete execution instruction confirmation screen.

In S712, the processing of making the image display panel 41 display an existing-screen delete execution instruction confirmation screen as exemplified by FIG. 19A in superimposition is carried out. The existing-screen delete execution instruction confirmation screen is for confirming an instruction as to whether or not the currently displayed image, which had been stored by the removable media 35 before the microscope-use digital camera 3 power was turned on in the immediate past is to be deleted.

In the ensuing S713, the processing of identifying what the instruction of the observing person that has been made according to the displayed aforementioned screen is carried out. In the processing of S713, if the identification is of an instruction for a delete execution by a pressing operation of the left selection switch 61, the process proceeds to S714 for carrying out the processing of deleting, from the removable media 35, the image file of the image currently displayed by the image display panel 41. This is followed by proceeding to the processing of S133 shown by FIG. 6. Conversely, if the identification is an instruction for canceling a delete execution by a pressing operation of the right selection switch 62 in the processing of S713, then the process proceeds to S135 shown by FIG. 6 without deleting an image file.

The next description is of the processing shown by FIG. 18C.

If the judgment result of S136 shown by FIG. 6 is "yes", then in S721, the processing of making the image display panel 41 display a delete-all execution instruction confirmation screen in superimposition is carried out. The delete-all execution instruction confirmation screen is for confirming an instruction as to whether or not to delete all the data files, including the ones stored in the removable media 35 before the microscope-use digital camera 3 power was turned on in the immediate past.

In the ensuing S722, the processing of identifying what the instruction of the observing person that has been made according to the aforementioned displayed screen is carried out. In the processing of S722, if the identification is an instruction for a delete-all execution by a pressing operation of the left selection switch 61, the process proceeds to S723 for carrying out the processing of deleting all the data files recorded by the removable media 35. This is followed by proceeding to the process of S139 shown by FIG. 6.

Conversely, in the processing of S722 if the identification is an instruction, by a pressing operation of the right selection switch 62, for leaving the data file, as is, stored by the removable media 35 before the microscope-use digital camera 3 power was turned on in the immediate past, among the data files recorded by the removable media 35, then the process proceeds to S724.

In S724, the processing of providing an instruction to the memory readout & write unit 36 and extracting an image file for which a read only attribute is not set in the file information list from among the image files recorded by the removable media 35 is carried out. In the ensuing S725, the processing of deleting all of the extracted image files only from the removable media 35 is carried out. This is followed by proceeding to the process of S139 shown by FIG. 6. Accordingly in this case, the data files stored by the removable media 35 before the microscope-use digital camera 3, power was turned on in the immediate past are left in the removable media 35 in lieu of being deleted.

The above described microscope-use digital camera 3 according to the present embodiment is configured to retain information of the data files, in the form of a list, recorded by the removable media 35. By this configuration, a data file management is enabled without rewriting a file attribute within the removable media 35 at the time of starting the supply of power to the microscope-use digital camera 3. Accordingly, it is possible for another apparatus, such as a PC, to delete the images recorded by the removable media 35 prior to the supply of power being started.

Eighth Embodiment

This embodiment is configured to limit data files as the subject of management by a file information list which is made in the above described seventh embodiment to image files displayable by the image display panel 41 as an image.

Figure 20:
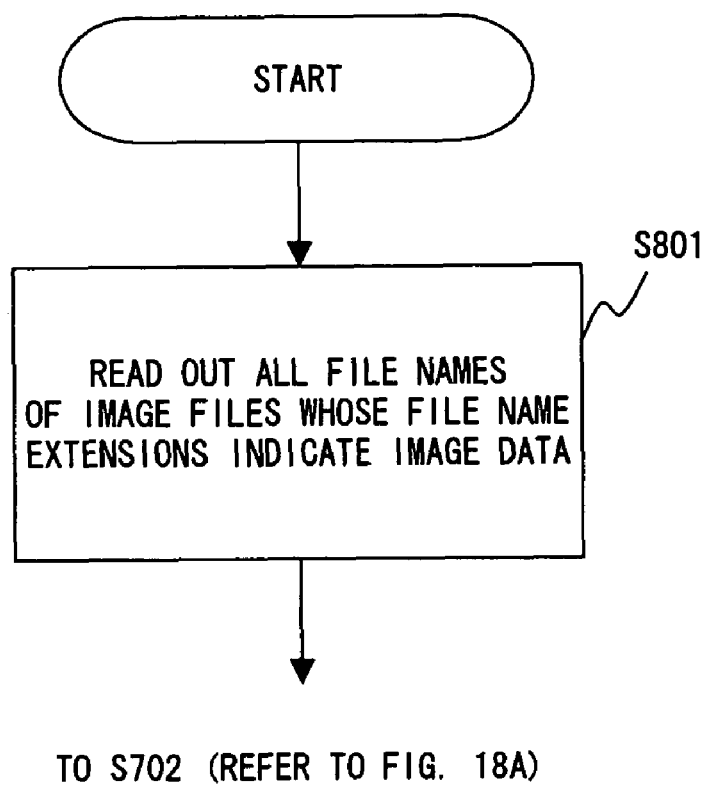
FIG. 20 shows a changed part in the eighth embodiment of a control processing shown by FIG. 18A.

To this end, the processing of S701 in the process shown by FIG. 18A carried out by the CPU 201 in the seventh embodiment is replaced by the processing of S801 shown by FIG. 20.

Describing the processing, in S801, the processing of providing an instruction to the memory readout & write unit 36 and making it read out all file names of data files (e.g., a data file given by a file name whose extension "jpg" indicating an image file by a data format which conforms to the previously described JPEG system) which are given the aforementioned file names whose extension indicates that the stored data are image data from among the data files recorded by the removable media 35 is carried out, followed by proceeding to the processing of S702 shown by FIG. 18A.

The above described microscope-use digital camera 3 according to the present embodiment is configured to make a list for setting the read only attribute for only the image files displayable by the microscope-use digital camera 3 per se among the data files recorded by the removable media 35, thereby reducing the amount of the attribute setting working. As a result, even if a removable media 35 is of a large capacity, storing a vast number of data files, a processing volume of the read only attribute setup processing for the aforementioned list is reduced, hence shortening the time required for the processing at the time of starting the supply of power to the microscope-use digital camera 3.

Ninth Embodiment

This embodiment is configured to judge whether or not a removable media 35 is the same as the one used in a microscope-use digital camera 3 immediately before the time when the aforementioned removable media 35 is inserted into an observation system including the microscope-use digital camera 3. And, if it is the same, the read only attribute is set for a data file recorded by the removable media 35.

Figure 21:
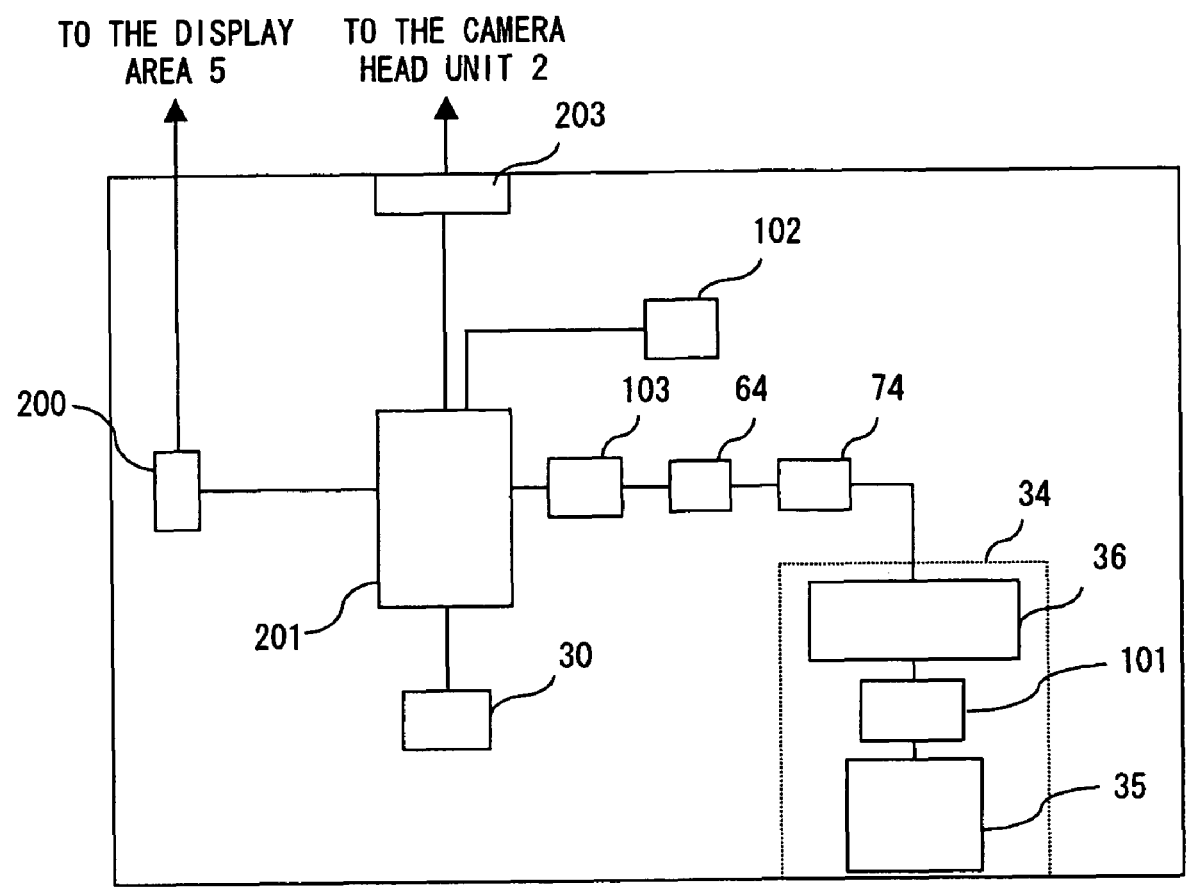
FIG. 21 shows an electrical configuration of an operator area according to a ninth embodiment.

FIG. 21 shows the electrical configuration of an operator area 4 according to the present embodiment. Note that in FIG. 21, components the same as those of the fourth embodiment, as shown by FIG. 13, are assigned the same numerals thereas.

The electrical configuration of the operator area 4 according to the present embodiment differs from that of the fourth embodiment lying in the comprisal of an ID storage unit 102 and an ID comparator 103 in the former embodiment.

The ID storage unit 102 stores a numerical value specified by the CPU 201, for example, any one of the numerical values between 0000 and FFFF (i.e., a hexadecimal number). The numerical number is defined as an ID value of the ID storage unit 102 herein. This ID value is used as identifier information for identifying a removable media 35 individually.

The ID comparator 103 compares a numerical value, indicated in an ID file recorded to the removable media 35 and the ID value of the ID storage unit 102, and outputs a judgment result, i.e., a presence or absence of identity between the aforementioned two values, to the CPU 201.

Figure 22:
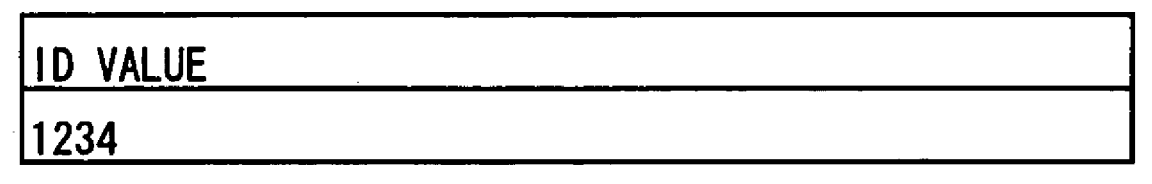

FIG. 22 shows an example of data in the ID file. As shown by FIG. 22, a numerical value is shown by a text file in the ID file. This value is defined as an ID value of the ID file herein.

The present embodiment is configured in such a way that the media detector 101 detects an insertion of a removable media 35, and the CPU 201 is notified of the detection result. The CPU 201 monitors the media detector 101 continuously and starts an execution of the control processing shown by FIG. 23, every time the CPU 201 obtains the detection result therefrom.

The description proceeds to FIG. 23.

First in S901, the processing of providing an instruction to the memory readout & write unit 36 to make it obtain the ID value of an ID file recorded by the removable media 35 is carried out. In the ensuing S902, the processing of making the ID comparator 103 judge whether or not the obtained ID value identifies with the ID value of the ID storage unit 102 is carried out. Note that, if an ID file is not recorded by the removable media 35 in the judgment processing, it is considered as a nonidentity between the aforementioned two values (i.e., the judgment result is "no").

Here in S902, if the judgment is an identity between the aforementioned two values (i.e., the judgment result is "yes"), the inserted removable media 35 is regarded as the same one which was used by the microscope-use digital camera 3 until the immediate past, and the process proceeds to S101 shown by FIG. 5 for carrying out the processing of setting the read only attribute for a data file recorded by the removable media 35.

Conversely, if the judgment is a nonidentity between the aforementioned two values (i.e., the judgment result is "no"), the inserted removable media 35 is regarded as a different one from that which was used by the microscope-use digital camera 3 up to the immediate past, and the process proceeds to S903. In S903, the processing of incrementing the ID value of the ID storage unit 102 by "1" is carried out. In this event, if the ID value of the ID storage unit 102 has already reached the maximum possible value, e.g., FFFF (in hexadecimal), the ID value is set at the minimum possible value for an ID value of the ID storage unit 102, e.g. 0000 (in hexadecimal).

In S904, the processing of providing an instruction to the memory readout & write unit 36 to have it make an ID file indicated by the current ID value of the ID storage unit 102 and record it to the removable media 35 is carried out. Incidentally in this processing, if an ID file is already recorded by the removable media 35, the record content is updated by overwriting the ID file. This processing makes the current ID value of the ID storage unit 102 identify with the current ID value of the ID file. Therefore, if the removable media 35 inserted into the microscope-use digital camera 3 afterwards is the same as the one used up to the immediate past, then the judgment result for the above described S902 becomes "yes".

In S905, the processing of resetting a series of settings for the microscope-use digital camera 3 relating to a photographing to an initial state (i.e., initialization), e.g., an exposure setting and various settings of operating conditions is carried out. This is followed by proceeding to the processing of S103 shown by FIG. 5, to carry out the processing of FIG. 5 without setting the read only attribute for a data file recorded by the removable media 35.

The above described microscope-use digital camera 3 according to the present embodiment is configured to set read only attribute for a data file at the time of inserting a removable media 35 if it is the one used in the immediate past. Therefore, in the case of using a removable media 35 shared by a plural number of persons and those used by the individual users, a bifurcated use of them is possible by setting the read only attribute for the shared removable media 35, while not setting a read only attribute for the individual use removable media 35, for instance. Meanwhile, if a removable media 35 different from the one used in the immediate past is inserted, a series of settings for the microscope-use digital camera 3 relating to photographing is initialized, and therefore it is possible to prevent an operational error from occurring as a result of operating the microscope-use digital camera 3 from the initial state.

Tenth Embodiment

This embodiment is configured to control a microscope-use digital camera 3 by a PC.

Figure 24:
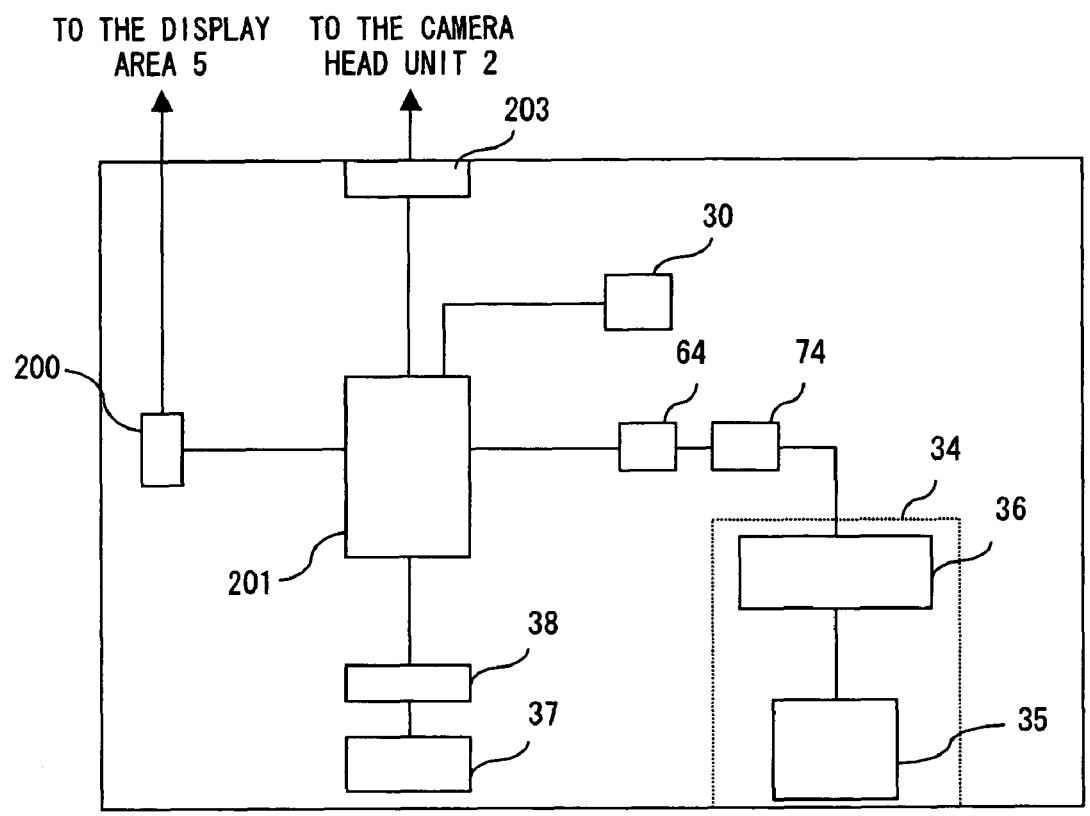
FIG. 24 shows an electrical configuration of an operator area according to a tenth embodiment.

FIG. 24 shows an electrical configuration of the operator area 4 according to the present embodiment. Note that components the same as those of the first embodiment, as shown by FIG. 3B, are assigned the same numerals in FIG. 24.

The electrical configuration of the operator area 4 according to the present embodiment differs from that of the first embodiment in comprising a telecommunication terminal 37 and a telecommunication control unit 38.

The CPU 201, by comprising the telecommunication control unit 38, is capable of carrying out a data exchange with a PC of a common configuration, i.e., comprising a CPU (central processing unit) for managing the operation control of the entire PC by executing a control program, a main memory used by the CPU as a working memory on an as required basis, an interface unit for managing various data exchanges, an auxiliary storage apparatus such as a hard disk apparatus for memorizing and storing various programs and image data, and a display unit for displaying an image expressed by image data and various information, by way of the telecommunication terminal 37; and controls the operation of the microscope-use digital camera 3 based on a control signal sent from the PC. Incidentally, the telecommunication terminal 37 can utilize a component conforming to the USB (universal serial bus) standard for example.

In order to control the microscope-use digital camera 3 by the PC, a control program for making the CPU of the PC carry out the above described various control processes is created and stored in a computer readable storage medium, and the program is read out from the storage medium to the PC to have the CPU execute with the PC being connected to the telecommunication terminal 37, thereby accomplishing the control.

Note that a computer readable storage medium for the recorded control program can utilize for example a storage apparatus such as a ROM and a hard disk apparatus comprised by a PC as either a built-in or an external auxiliary apparatus, a portable storage medium such as a flexible disk, MO (magneto optical disk), CD-ROM, DVD-ROM which allows a readout of the recorded control program by being inserting into a media drive apparatus comprised by the PC, et cetera.

Additionally, such storage medium may be a storage apparatus comprised by a program server which is connected to the PC by way of a telecommunication line. In such a case, the configuration is to transmit, from the program server to the PC by way of a telecommunication line, i.e., a transmission media, a transmission signal obtained by modulating a carrier wave by a data signal expressing the control program so that the PC demodulates the received transmission signal to reproduce the control program, thereby enabling the CPU of the PC to execute the control program.

The above describes each embodiment according to the present invention. As understood from the above descriptions, every embodiment of the present invention provides the benefit of making the arrangement of image files easy.

Note that the present invention allows various improvements and/or changes within the scope thereof in lieu of being limited by the above described each embodiment.

For instance, referring to FIG. 1, a configuration may eliminate the operator & display unit 6 and, instead, connect the camera head unit 2 to the PC directly. In such a case, the camera head unit 2 is connected with the PC by utilizing a general purpose telecommunication interface such as a USB. Then, the PC transmits a camera control instruction to the camera head unit 2. This configuration enables the control of exposure time and photographing et cetera. of the camera head unit 2.

What is claimed is:

1. A camera for recording a specimen image obtained by a microscope, comprising:
   a record control unit for making a storage medium record an image data file expressing the specimen image;
   a switch unit for controlling a supply of power to the camera;
   an attribute setting unit for automatically setting, in accordance with a start of the supply of power performed by the switch unit, a read only attribute for a data file already recorded by the storage medium at a time of the start of the supply of power performed by the switch unit; and
   a list creation unit for creating a list of data file(s) recorded by the storage medium;
   wherein the list creation unit creates a list of data file(s) already recorded by the storage medium at the time of starting the supply of power by the switch unit; and
   wherein the attribute setting unit cancels the read only attribute set for the data file(s) shown in the list when the supply of power is stopped by the switch unit.

2. The camera according to claim 1, further comprising a display unit for replaying and displaying an image expressed by an image data file, wherein the attribute setting unit sets the read only attribute for an image data file expressing an image displayable by the display unit among data files already recorded by the storage medium.

3. The camera according to claim 1, further comprising a selection unit for selecting whether or not to make the attribute setting unit set the read only attribute.

4. The camera according to claim 1, further comprising a control unit for controlling an action of the camera based on a control signal sent from another apparatus.

5. A camera for recording a specimen image obtained by a microscope, comprising:
   a record control unit for making a storage medium record an image data file expressing the specimen image;
   a switch unit for controlling a supply of power to the camera;
   an attribute setting unit for automatically setting, in accordance with a start of the supply of power performed by the switch unit, a read only attribute for a data file already recorded by the storage medium at a time of the start of the supply of power performed by the switch unit; and
   a list creation unit for creating a list of data file(s) recorded by the storage medium;
   wherein the list creation unit creates a list of data file(s) already recorded by the storage medium at the time of starting the supply of power by the switch unit; and
   wherein the list creation unit adds the read only attribute to the list for the data file(s) already recorded by the storage medium at the time that the supply of power is started by the switch unit, and the list creation unit does not add the read only attribute to the list for an image data file that the record control unit has made the recording medium record after the supply of power is started.

6. A camera for recording a specimen image obtained by a microscope, comprising:
   a record control unit for making a storage medium record an image data file expressing the specimen image;
   a switch unit for controlling a supply of power to the camera;
   an attribute setting unit for automatically setting, in accordance with a start of the supply of power performed by the switch unit, a read only attribute for a data file already recorded by the storage medium at a time of the start of the supply of power performed by the switch unit;
   an initialization unit for applying an initialization processing to the storage medium; and
   an initialization control unit for controlling the initialization unit so as not to apply the initialization processing to the storage medium, if the read only attribute is set for a data file recorded by the storage medium.

7. A camera for recording a specimen image obtained by a microscope, comprising:
   a record control unit for making the camera record, in a removably inserted overwritable storage medium, an image data file expressing the specimen image;
   an attribute setting unit for setting a read only attribute of a data file already recorded by the overwritable storage medium at a time of inserting the overwritable storage medium into the camera;
   an initialization unit for applying an initialization processing to the overwritable storage medium so as to delete all data files recorded by the overwritable storage medium; and
   an initialization control unit for controlling the initialization unit so as not to apply the initialization processing to the overwritable storage medium, if the read only attribute is set for a data file recorded by the overwritable storage medium.

8. The camera according to claim 7, further comprising a selection unit for selecting whether or not to make the attribute setting unit set the read only attribute.

9. The camera according to claim 7, further comprising:
   a control unit for controlling an action of the camera based on a control signal sent from another apparatus.

10. A camera for recording a specimen image obtained by a microscope, comprising:
    a record control unit for making a storage medium record an image data file expressing the specimen image;
    a switch unit for controlling a supply of power to the camera;
    a list creation unit for automatically creating, in accordance with a start of the supply of power performed by the switch unit, a list of data file(s) already recorded by the storage medium at a time of the start of the supply of power performed by the switch unit;
    a delete unit for deleting data file(s) in the storage medium; and
    a delete control unit for making the delete unit delete only data file(s) not included in the list among data file(s) stored by the storage medium when an instruction to delete the data file(s) is obtained.

11. The camera according to claim 10, further comprising a display unit for replaying and displaying an image expressed by an image data file, wherein the list creation unit creates the list for only image data file(s) expressing image(s) displayable by the display unit among data files already recorded by the storage medium.

12. The camera according to claim 10, further comprising a control unit for controlling an action of the camera based on a control signal sent from another apparatus.

13. A camera for recording a specimen image obtained by a microscope, comprising:
    a record control unit for making the camera record, in a removably inserted storage medium, an image data file expressing the specimen image;
    a judgment unit for judging whether or not the storage medium that is inserted is the same as the storage medium inserted immediately prior to a time when the storage medium is inserted;
    an attribute setting unit for setting a read only attribute of a data file already recorded by the storage medium when the judgment unit judges that the inserted storage medium is the storage medium inserted immediately prior thereto; and
    an identifier information record unit for generating identifier information for identifying the storage medium individually and making the storage medium record it, wherein the judgment unit carries out the judgment by using the identifier information recorded by the storage medium;
    wherein the judgment unit compares the identifier information recorded by the inserted storage medium with the identifier information recorded by the storage medium inserted immediately prior thereto and, if both pieces of identifier information match each other, judges that the inserted storage medium is the same as the storage medium inserted immediately prior thereto; and
    wherein the identifier information record unit makes the inserted storage medium store the identifier information anew if said judgment unit judges that the inserted storage medium is not the storage medium inserted immediately prior thereto.

14. The camera according to claim 13, further comprising:
    an imaging unit for generating the image data file by photographing the specimen image; and
    an action condition initialization unit for initializing a setup of an action condition of the imaging unit when the judgment unit judges that the inserted storage medium is not the storage medium inserted immediately prior thereto.

15. The camera according to claim 13, further comprising a control unit for controlling an action of the camera based on a control signal sent from another apparatus.

* * * * *